US010084659B2

(12) United States Patent
Dong et al.

(10) Patent No.: US 10,084,659 B2
(45) Date of Patent: Sep. 25, 2018

(54) SYSTEMS AND METHODS FOR ENHANCED DISCOVERY

(71) Applicant: CONVIDA WIRELESS, LLC, Wilmington, DE (US)

(72) Inventors: Lijun Dong, San Diego, CA (US); Chonggang Wang, Princeton, NJ (US); Dale N. Seed, Allentown, PA (US)

(73) Assignee: Convida Wireless, LLC, Wilmington, DE (US)

( * ) Notice: Subject to any disclaimer, the term of this patent is extended or adjusted under 35 U.S.C. 154(b) by 199 days.

(21) Appl. No.: 14/891,160

(22) PCT Filed: May 16, 2014

(86) PCT No.: PCT/US2014/038440
§ 371 (c)(1),
(2) Date: Nov. 13, 2015

(87) PCT Pub. No.: WO2014/186733
PCT Pub. Date: Nov. 20, 2014

(65) Prior Publication Data
US 2016/0072678 A1 Mar. 10, 2016

Related U.S. Application Data

(60) Provisional application No. 61/823,988, filed on May 16, 2013.

(51) Int. Cl.
*H04W 28/04* (2009.01)
*H04L 12/24* (2006.01)
(Continued)

(52) U.S. Cl.
CPC .............. *H04L 41/12* (2013.01); *H04L 67/16* (2013.01); *H04W 4/70* (2018.02)

(58) Field of Classification Search
CPC ......... H04L 29/08; H04L 12/24; H04L 67/12; H04L 67/16; H04L 67/06; H04L 41/0853; H04L 41/00
See application file for complete search history.

(56) References Cited

U.S. PATENT DOCUMENTS 7,656,822 B1 * 2/2010 AbdelAziz .......... H04L 12/4633
370/255
9,596,123 B2 * 3/2017 Hinton .................... H04L 41/00
(Continued)

FOREIGN PATENT DOCUMENTS

EP 2141601 A1 6/2010
JP 2003-141007 A1 5/2003
(Continued)

OTHER PUBLICATIONS

Dong et al, "On the Cache-and-Forward Network Architecture", Communications, 2009, ICC '09, IEEE Conference on Jun. 14-18, 2009.
(Continued)

*Primary Examiner* — Hanh N Nguyen
(74) *Attorney, Agent, or Firm* — Baker & Hostetler, LLP

(57) ABSTRACT

Disclosed herein are a variety of devices, methods, processes, and systems for providing enhanced service discovery. Entities in a network may send requests for service discovery to a resource directory and the resource directory may respond with the requested discovery information. This discovery information may be cached at a network node located on the path between the requesting entity and the resource directory. Upon detecting a similar discovery request, the network node may reply with the cached discovery information, forward the request to another entity based on the cached discovery information, or reply with an address or location of another entity that may have the requested discovery information.

20 Claims, 21 Drawing Sheets

(51) Int. Cl.
H04W 4/70 (2018.01)
H04L 29/08 (2006.01)

(56) References Cited

U.S. PATENT DOCUMENTS

| | | | | |
|---|---|---|---|---|
| 9,654,900 | B2* | 5/2017 | Seed | H04W 4/005 |
| 2017/0208139 | A1* | 7/2017 | Li | H04L 67/16 |

FOREIGN PATENT DOCUMENTS

| | | |
|---|---|---|
| JP | 2004-127189 A | 4/2004 |
| JP | 2007-184669 A | 7/2007 |
| WO | WO 00-14938 A2 | 3/2000 |
| WO | WO 2008-120366 A1 | 9/2008 |
| WO | WO 2011-112683 | 9/2011 |

OTHER PUBLICATIONS

Guttman et al, "Service Location Protocol, Version 2", Network Working Group, RFC#2608, Jun. 1999, 51 pages.

Interdigital Communications et al; "M2M SCL Discovery Procedures", Internet Citation, Mar. 7, 2011, pp. 1-8, Retrieved from the Internet: URL:http://docbox.etsi.org/M2M/ [retrieved on Jun. 1, 2012] abstract.

International Application No. PCT/US2014/038440: International Search Report and Written Opinion dated Oct. 21, 2014, 21 pages.

Seno et al, "Survey and new Approach in Service Discovery and Advertisement for Mobile Ad hoc Networks", IJCSNS International Journal of Computer Science and Network Security, 7(2), Feb. 2007, 275-284.

Shelby et al, "Constrained Application Protocol (CoAP); draft-ietf-core-coap-01", Jul. 8, 2010, 1-36 pages.

Shelby et al, "Constrained Application Protocol (CoAP); draft-ietf-core-coap-07", Internet Engineering Task Force, Ietf; Standard Working Draft, Jul. 8, 2011, 1-86.

Shelby, Z., "Constrained RESTful Environments (CoRE) Link Format", Internet Engineering Task Force (IETF), RFC# 6690, Aug. 2012, 22 pages.

Veizades et al, "Service Location Protocol", Network Working Group, RFC#2165, Jun. 1997, 73 pages.

Zhang et al, "Named Data Networking (NDN) Project", NDN, Technical Report NDN-0001, Oct. 2010, 26 pages, http://named-data.net/techreports.html.

Japanese Patent Application No. 2016-514138: Notice of Reasons for Rejection dated Jan. 27, 2017, 5 pages.

* cited by examiner

SYSTEMS AND METHODS FOR ENHANCED DISCOVERY

CROSS-REFERENCE TO RELATED APPLICATIONS

This application is a National Stage Application filed under 35 U.S.C. 371 of International Application No. PCT/US2014/038440, filed May 16, 2014, which claims the benefit of U.S. Provisional Patent Application No. 61/823,988, filed on May 16, 2013, entitled "SYSTEMS AND METHODS FOR ENHANCED DISCOVERY", the contents of which are hereby incorporated by reference herein.

BACKGROUND

Current network and communications technologies, such as machine-to-machine (M2M) technologies and the Internet, allow devices to communicate more directly with each other using wired and wireless communications systems. M2M technologies in particular enable further realization of the Internet of Things (IoT), a system of uniquely identifiable objects and virtual representations of such objects that communicate with each other and over a network, such as the Internet. IoT may facilitate communication with even mundane everyday objects, such as products in a grocery store or appliances in a home, and thereby reduce costs and waste by improving knowledge of such objects. For example, stores may maintain very precise inventory data by being able to communicate with, or obtain data from, objects that may be in inventory or may have been sold. Other networks of communicatively connected entities and objects may also facilitate similar functionality.

Each of the entities in almost any communications network, including IoT or similar networks of connected entities, need a mechanism to discover other entities in the network so that they can communicate to accomplish tasks and perform functions. Current discovery mechanisms typically take two forms. In directory-based discovery, there is a directory server or other directory entity that entities in the network may query to discover resources. ("Resources" as used herein refers to any devices, services, entities, and any other function, capability, or "thing" available in the network). Directory servers may be centrally located or distributed about the network. In directory-less discovery, individual entities broadcast or multicasts discovery requests across the network, or a subsection thereof. Resource providing entities respond to this request by reporting the resources available at the entity. Some implementations, such as those that use the Internet Engineering Task Force (IETF) Service Location Protocol (SLP), may support both directory-based and directory-less discovery.

In current implementations, multiple discovery requests for the same type of resource may be processed by a resource directory server or an entity that provides a resource as entities in the network attempt to use same types of resources. This repeated processing of similar or the same type of discovery requests can add significant overhead to such entities, and where such entities have limited processing, communications, power, and/or other capabilities, may affect the entities' ability to perform other tasks.

SUMMARY

Embodiments disclosed herein include methods for receiving a first discovery request from a first entity at a network node in a network of connected entities, transmitting the first discovery request to a resource directory entity, receiving a first discovery response from the resource directory entity, storing first discovery response data at the network node based on the first discovery response, and transmitting the first discovery response to the first entity. Then, when the network node receives a second discovery request from a second entity, it may determine that discovery request data of the second discovery request corresponds to the first discovery response data and therefore may transmit a second discovery response including the first discovery response to the second entity instead of forwarding the second request to the resource directory.

Embodiments disclosed herein further include a network node that includes a processor that executes instructions to receive a first discovery request from a first entity at a network node in a network of connected entities, transmit the first discovery request to a resource directory entity, receive a first discovery response from the resource directory entity, store first discovery response data at the network node based on the first discovery response, and transmit the first discovery response to the first entity. Then, when the network node receives a second discovery request from a second entity, it may determine that discovery request data of the second discovery request corresponds to the first discovery response data and therefore may transmit a second discovery response including the first discovery response to the second entity instead of forwarding the second request to the resource directory.

Embodiments disclosed herein further include a network node that includes a processor that executes instructions to receive a first discovery request from a first entity at a network node in a network of connected entities, transmit the first discovery request to a resource directory entity, receive a first discovery response from the resource directory entity, store first discovery response data at the network node based on the first discovery response, and transmit the first discovery response to the first entity. Then, when the network node receives a second discovery request from a second entity, it may determine that discovery request data of the second discovery request corresponds to the first discovery response data and therefore may transmit a second discovery response that includes a location of the first entity to the second entity, or redirect the second request to the second entity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF ILLUSTRATIVE EMBODIMENTS

Figure 1:
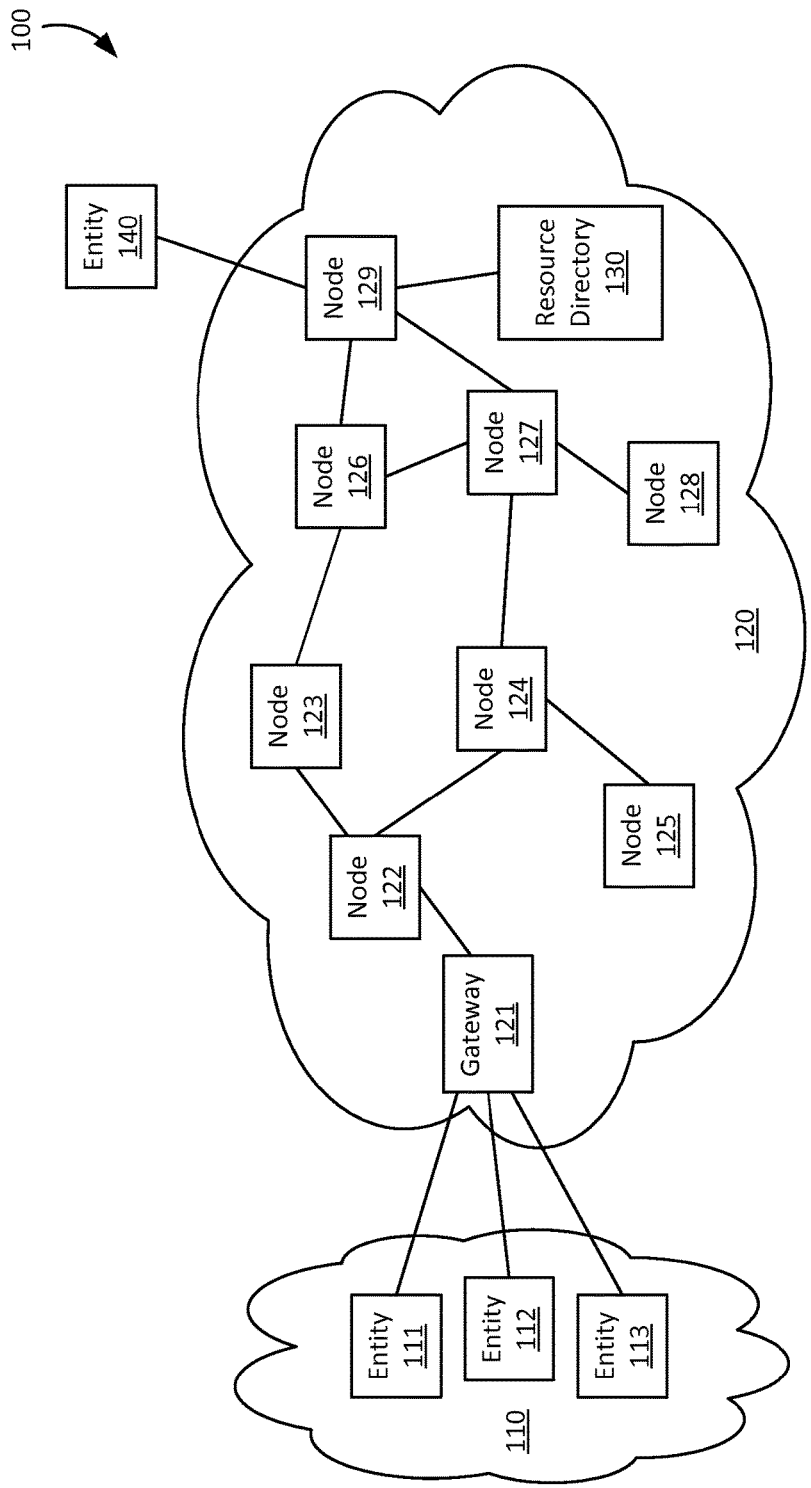
FIG. 1 illustrates an exemplary system in which embodiments of enhanced resource discovery may be implemented.

The embodiments set forth herein may be described in terms of a representational state transfer (REST) architecture, with components and entities described conforming to the constraints of a REST architecture (RESTful architecture). A RESTful architecture is described in terms of the constraints applied to components, entities, connecters, and data elements used in the architecture rather than in terms of physical component implementation or communications protocols used. Thus, the roles and functions of the components, entities, connecters, and data elements may be described using a RESTful architecture, where representations of uniquely addressable resources may be transferred between entities. However, many other embodiments are contemplated that may be implemented in other environment as set forth herein. For example, embodiments of the instant disclosure may be implemented in architectures defined or described in terms of a service-oriented architecture (SOA) or any other architecture or abstraction that allows the discovery of resources.

One skilled in the art will recognize that implementations of the instant embodiments may vary while remaining within the scope of the present disclosure. One skilled in the art will also recognize that the disclosed exemplary embodiments, while sometimes described herein in reference to the European Telecommunications Standards Institute (ETSI) M2M architecture, are not limited to implementations using the ETSI M2M architecture. The disclosed embodiments may be implemented in other architectures and systems that have connected entities, such as one M2M and other M2M systems and architectures. The disclosed embodiments may also be applicable more generally to computer networks and systems having one or more computer networks. For example, the disclosed embodiments may be implemented at a router, hub, gateway, switch, or server on the Internet or in any network that includes interconnected devices. All such embodiments are contemplated as within the scope of the present disclosure.

In order to address the issues present in current resource discovery mechanisms, the instant disclosure will describe several embodiments that may be used in any network or collection of communicatively connected entities. In many of the disclosed embodiments, in-network storage at intermediate nodes along the path between a discovery requester and a resource directory or a resource-providing entity may be used. For example, and as described in more detail herein, more efficient resource discovery may be implemented using discovery result caching at intermediate nodes that may reply to discovery requests instead of forwarding such requests to a resource directory or a resource-providing entity. In other embodiments, the broadcasting of discovery results by intermediate nodes may be used to inform nodes proximate to a resource directory or a resource-providing entity of cached discovery results. In still other embodiments, a resource directory, resource-providing entity, and/or intermediate nodes may keep records of discovery requests that include an indication of the requester. When a same or similar discovery request is subsequently received by the node, directory, or entity, it may notify the requester that a previous requester may have the discovery result requested, or it may forward the request to the previous requester.

Other embodiments allow the updating modification of cached discovery results. For example, in an embodiment, where a cached discovery result has become invalid or incomplete, the caching directory, entity, or node may modify the cached discovery result based on the publishing and un-publishing of information in the network to prolong the utility of the cached discovery result. An intermediate node may also receive discovery results from multiple resource directories or resource-providing entities and may combine such results to provide load-balancing among the multiple resource providers for resource retrieval and delivery. Alternatively, an intermediate node may not store an entire discovery result, but may only cache a portion of it. Exemplary messages and procedures are defined in this disclosure to enable these mechanisms. In the instant disclosure, SLP may be used in some examples to illustrate the exemplary embodiments described in this disclosure, but other protocols and mechanisms for implementing the disclosed embodiments are contemplated as within the scope of the present disclosure.

Note that throughout the instant disclosure, an example resource used for illustration of various embodiments will be a provider of surveillance video content. This is merely one of many embodiments and used herein only for exemplary purposes. The disclosed embodiments may be applicable to any resource, service, entity, device, etc., and no limitation on any embodiment is intended by the use of this example.

FIG. 1 illustrates an example architecture 100 that may support embodiments disclosed herein. Note that the various entities described in regard to FIG. 1 are used for illustrative purposes only, and that other architectures and configurations are contemplated. The various entities described may be implemented using any number and combination of devices and software, may be located in any network, section of a network, etc., and may interconnect and/or communicate with any other entities, whether described herein or otherwise. All such embodiments are contemplated as within the scope of the present disclosure.

A discovery request may be transmitted by an entity in, for example, edge network or radio access network (RAN) 110, such as one of entities 111-113. This discovery request may be addressed or otherwise directed to resource directory 130. The discovery request may first be received at gateway 121 in core network 120 and may then traverse one or more intermediate nodes, such as any combination of nodes 122-129, that facilitate delivery of the request to resource directory 130. Resource directory 130 may then reply with a discovery result directed to the requesting entity. While the discovery result is forwarded to the requesting entity by any combination of nodes 122-129 and gateway 121, any of these nodes and/or and gateway 121 may cache the discovery result, or some portion thereof. Each node and gateway in architecture 100 may independently and separately determine whether to cache the discovery result, based on any criteria that each node or the gateway may be configured to determine or based on a configuration of such nodes and the gateway. When a same or similar discovery request is received by one of nodes 122-129 or gateway 121 that have cached the discovery result, such entities may reply to the request itself with the cached data, without forwarding the request to resource directory 130. This effectively reduces the load on resource directory 130 by preventing resource directory 130 from handling the same or similar discovery requests multiple times and also saves network bandwidth on the path to resource directory 130 by removing repetitive resource discovery requests and responses across the links of that path. The intermediate nodes that responded to such a discovery request may send a notification to resource directory 130 notifying it of the discovery request or may send a combined notification for a number of discovery requests to which it has replied. This may allow resource directory 130 to determine popularity of a resource based on the number of times the resource has been discovered.

In an embodiment, a discovery request may include a discovery key field that may be a structure that includes one or more identifiers indicating different types of resource discovery. As discussed in more detail herein, various possible identifiers may indicate discovery type, scope, predicate, and/or combination of type and scope. In an embodiment, the content of the discovery key field may be echoed back to the requester in the discovery response. The discovery key field may contain any data or indicators that may be recognized by a resource directory, such as resource directory 130. For example, where data content is provided by an application, key words associated with the data in which a requester is interested, a type of requested data, and/or a location where the requested data is collected and/or stored may be in the field. For example, a request may indicate that the requester is interested in surveillance video content from an M2M and/or IoT resource. The discovery key field may also, or instead, include one or more identifiers that indicate requested content's caching location(s), for example by including an identifier of the content combined with a hosting location. The discovery key field may also, or instead, include one or more identifiers that indicate a service provider, and in some embodiments, an identifier of a service combined with the service's hosting location. The discovery key field may also, or instead, include one or more identifiers that indicate a type of the service and a location of the requester's interest (may be the requester's location), allowing a determination of service providers that are most proximate to the requester.

Figure 2:
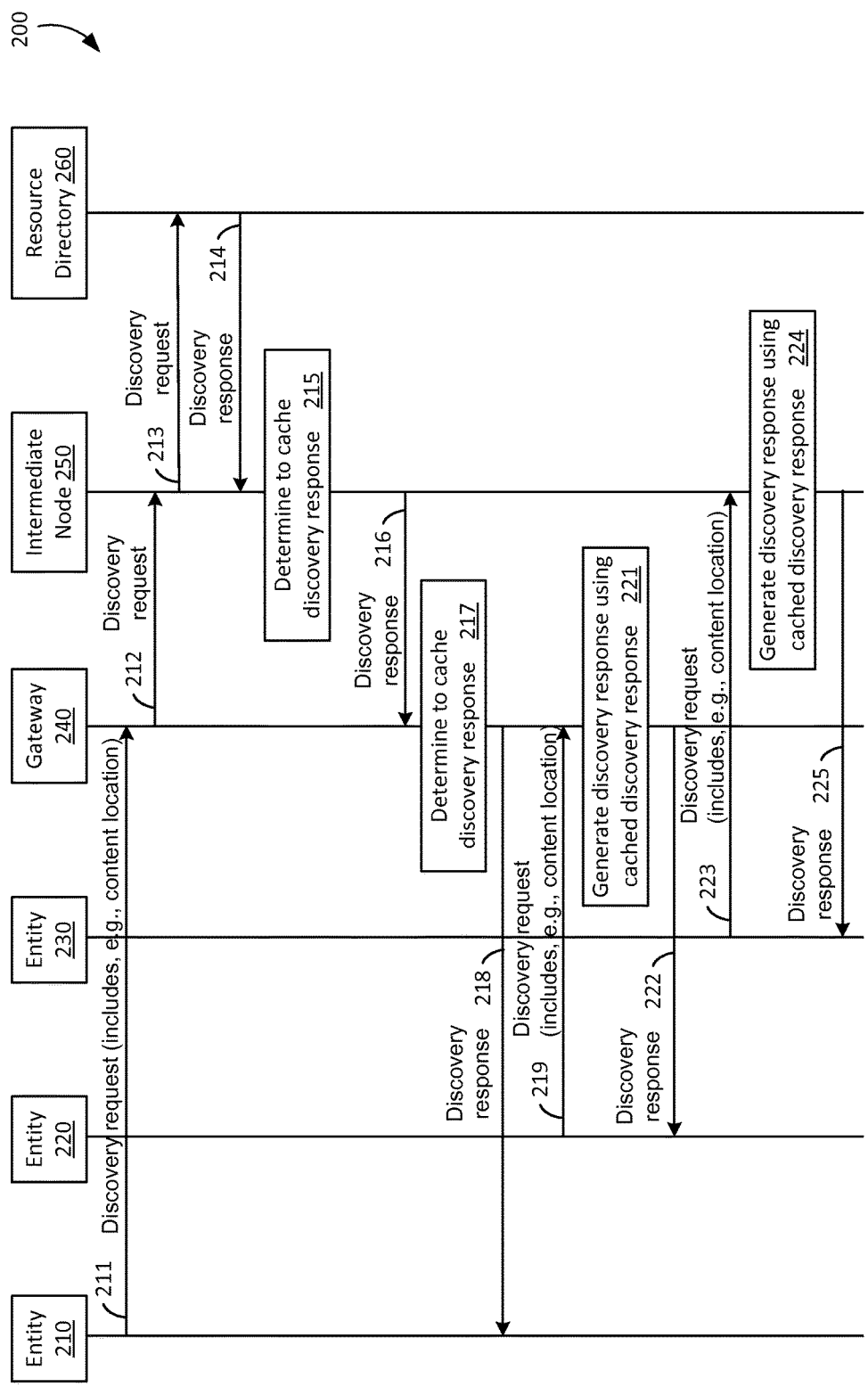
FIG. 2 illustrates a signal flow demonstrating an exemplary process for implementing embodiments of enhanced resource discovery.

FIG. 2 shows exemplary, non-limiting signal flow 200 illustrating exemplary signals and procedures for resource discovery. At 211, entity 210 may send a discovery request addressed to resource directory 260 and that may be received at gateway 240. Discovery request 211 may include data, for example in a discovery key field, that is associated with a requested service. For example, discovery request 211 may indicate the location (in most embodiments, a logical location, such as an address or a means of access, rather than a geographical location; however geographical location embodiments are also contemplated) of the entity requesting the requested content and/or an identifier of the requested content. In one example, discovery request 211 may indicate that the requester would like to discover a surveillance video content resource.

Gateway 240, upon receipt of discovery request 211 may determine that it does not have locally cached resource information for the requested resource and, in response, may generate and send discovery request 212 to intermediate node 250, which may relay the request as discovery request 213 to resource directory 260. Resource directory 260 may reply with discovery response 214 that is sent to intermediate node 250 that relays the response as discovery response 216 that is further relayed back to entity 210 as discovery response 218. In an example, discovery response 214 may indicate an address or location of a surveillance video content resource.

Upon receipt of discovery response 214, at block 215, intermediate node 250 may determine to cache discovery response 214, or some portion thereof, for future use in responding to similar discovery requests. Similarly, gateway 240 may also, upon receipt of discovery response 216, determine to cache discovery response 214, or some portion thereof, for future use in responding to similar discovery requests.

At 219, entity 220 may send a discovery request that is identical or similar to discovery request 211. For example, discovery request 219 may include the same content location identifier as discovery request 211. Alternatively, or in addition, the request may indicate that, in one example, entity 220 is interested in the same surveillance video content resource as entity 210 indicated in request 211. Entity 220 may also use the same gateway, gateway 240, as entity 210 that sent discovery request 211. However, because gateway 240 cached the discovery response to entity 210's discovery request 211, at block 221, gateway 240 may generate discovery response 222 that is sent to entity 220 in response to receiving discover request 219. This removes the need to forward the discovery request through the network to resource directory 260, thus removing some overhead and strain on the elements that would otherwise be involved in processing such a request, such as intermediate node 250 and resource directory 260. In an example, discovery response 222 may indicate an address or location of a surveillance video content resource that gateway 240 had cached upon receiving the address or location of the surveillance video content resource in response 214. Note that discovery of, requests for, and responses to requests for a surveillance video content resource address or location may be used in any of the disclosed embodiments, as well as the discovery of, requests for, and responses to requests for any other resource or service. All such embodiments are contemplated as within the scope of the present disclosure.

At 223, entity 230 may send a discovery request that is identical or similar to discovery request 211. For example, discovery request 223 may include the same content location identifier as discovery request 211. Entity 230 may not use the same gateway, gateway 240, as entity 210 that sent discovery request 211. Therefore, discovery request 223 may bypass gateway 240. However, the path from entity 230 to resource directory 260 may traverse intermediate node 250 that cached the discovery response to entity 210's discovery request 211. Thus, at block 224, intermediate node 250 may generate discovery response 225 that is sent to entity 230 in response to receiving discover request 223. This removes the need to forward the discovery request through the network to resource directory 260, thus removing some overhead and strain on the elements that would otherwise be involved in processing such a request, such as other intermediate nodes and resource directory 260.

In an embodiment, an intermediate node may cache a discovery result and broadcast the result and/or related information to entities in its network or subsection of its network. The information broadcast may include data in a discovery key field as described herein indicating characteristics of the resource being advertised by the broadcast. In order to keep broadcast overhead low, an intermediate node may select the interfaces over which the broadcast may be transmitted and may limit the broadcast radius by specifying the number of hops to which the broadcast may be sent.

Figure 3:
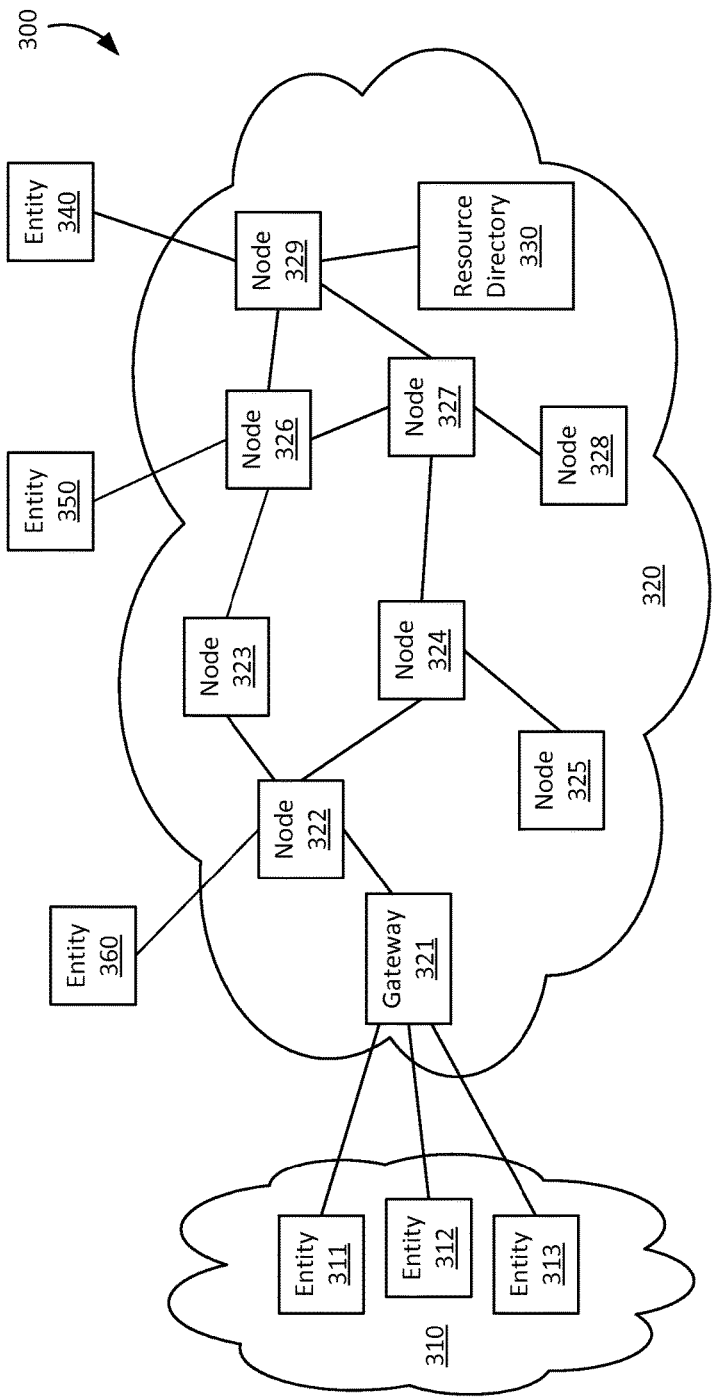
FIG. 3 illustrates an exemplary system in which embodiments of enhanced resource discovery may be implemented.

FIG. 3 illustrates an example architecture 300 that may support such embodiments. In this example, intermediate node 327 may have cached a discovery response and may broadcast associated discovery information through interfaces to intermediate nodes 329, 326, and 324, but may not broadcast the information through the interface to intermediate node 328. Intermediate node 327 may limit the number of hops that the information may be sent to, for example, one hope, so that intermediate nodes 329, 326, and 324 do not further forward the information to their neighbors. Thus, in this example, any discovery request that traverses any of intermediate nodes 327, 329, 326, and 324 may be addressed using the cached information at that node. For example, any discovery request from any of entities 311-313 in edge network 310, or entities 340, 350, and 360 that enter core network 320, that matches the discovery key field data of the cached discovery response stored at any of intermediate nodes 327, 329, 326, and 324 may be addressed by the node with the cached information. The remaining nodes 321, 322, 323, and 325 may simply relay such traffic as they normally would, but may also cache responses detected even if such responses originated with a node using cached discovery response data. Alternatively, and as described in more detail herein, using disclosed embodiments such nodes may forward requests to nodes that do have the cached discovery response or related information to address the request.

Figure 4:
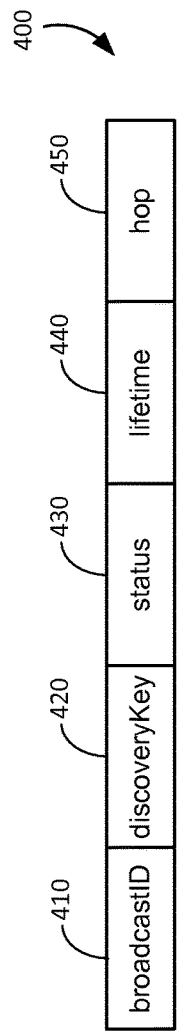
FIG. 4 illustrates an exemplary message format that may be used in embodiments of enhanced resource discovery.

In an embodiment, a broadcast discovery response may be sent as exemplary, non-limiting broadcast message 400 of FIG. 4. In message 400 the field broadcastID 410 may be an identifier of the broadcast message. BroadcastID 410 may include an identifier, such as an Internet Protocol (IP) address, of the entity that originated broadcast message 400. Message 400 may also include the field discoveryKey 420 that may be extracted from a cached discovery response and that may include discovery key field data as disclosed herein. Message 400 may also include the field status 430 that may indicate the status of the message and/or the information contained therein. For example, status 430 may indicate that message 400 is a broadcast message for notifying neighboring nodes of a newly cached discovery result or it may indicate that message 400 is a broadcast message intended to delete a previously provided discovery result. Message 400 may also include the field lifetime 440 that may indicate how long the cached discovery response is to be considered to be valid. The lifetime may be estimated by the node that is broadcasting the discovery information. Lifetime may be provided in any form, including an amount of time (e.g., an hour, a day, etc.) or a specific time (e.g., noon on a particular date) at which the cached discovery response expires. Message 400 may further include the field hop 450 that may designate the number of hops that the broadcast message will be propagated, thus providing a means to limit the transmission radius of the cached discovery response or related information.

Figure 5:
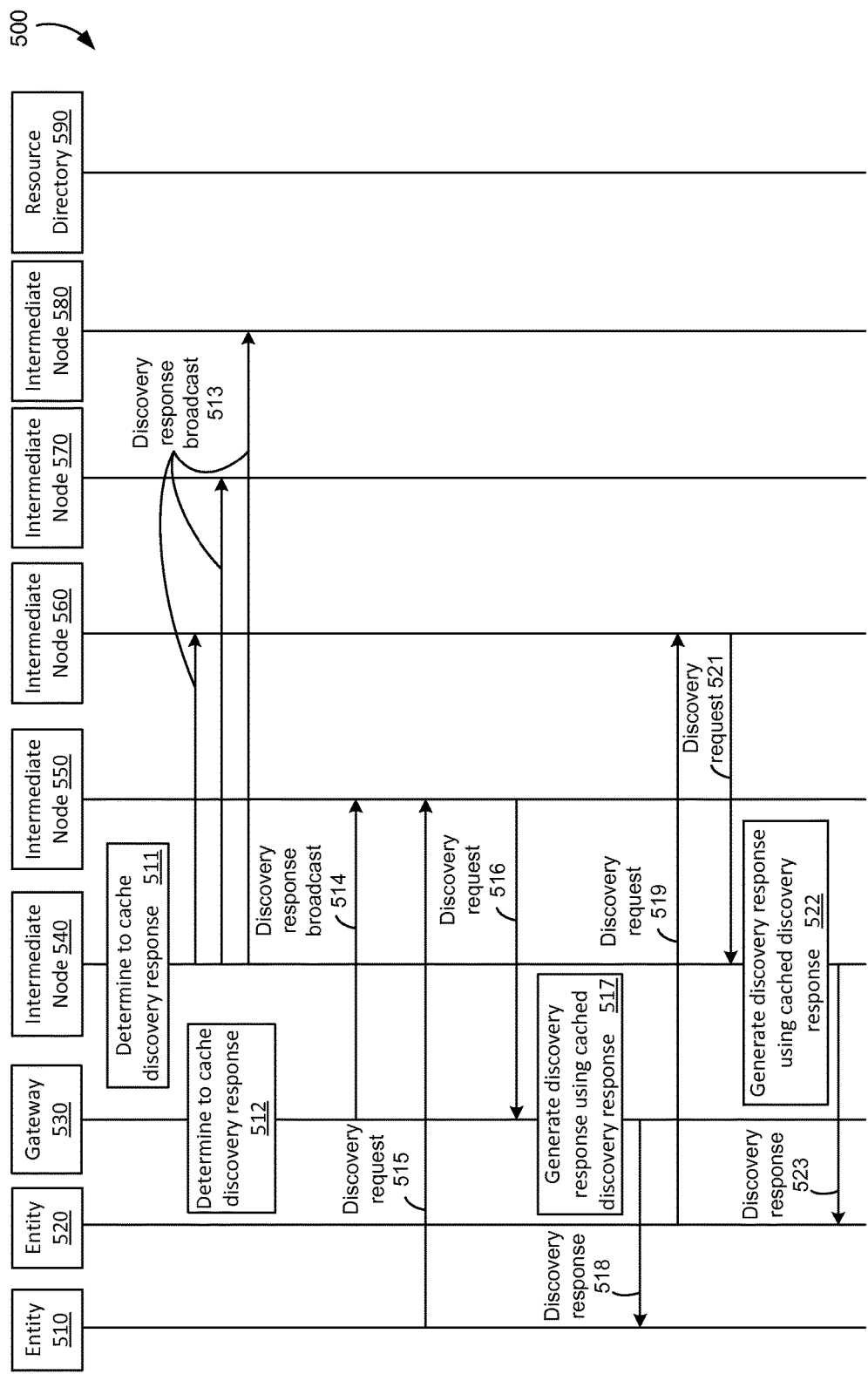
FIG. 5 illustrates a signal flow demonstrating an exemplary process for implementing embodiments of enhanced resource discovery.

FIG. 5 shows exemplary, non-limiting signal flow 500 illustrating exemplary signals and procedures for broadcasting a discovery response or related information. At block 511, intermediate node 540 may cache a discovery result generated at resource directory 590. Likewise, at 512, gateway 530 may also cache the same discovery result generated at resource directory 590. Gateway 530 may broadcast the discovery result, or associated information, using, in an embodiment, the message format of FIG. 4. The hop field of the message may indicate a single hop, and therefore, gateway 530, which may be directly connected to only one other intermediate node, intermediate node 550, may broadcast the message with the discovery result information to intermediate node 550 at 514. Intermediate node 540 may be directly connected to intermediate nodes 560, 570, and 580, and therefore may broadcast the discovery result, or associated information, using the message format of FIG. 4 to each of these nodes at 513. Thus, intermediate node 550 may have the discovery result information and may know that gateway 530 has the information, while each of intermediate nodes 560, 570, and 580 may have the discovery result information and may know that intermediate node 540 has the information.

At 515, entity 510 may send a discovery request that corresponds to (i.e., has the same discovery key field information as) the cached discovery result information stored at intermediate node 540 and gateway 530. When discovery request 515 arrives at intermediate node 550, while in one embodiment intermediate node 550 may reply using its cached discovery information, in another embodiment, intermediate node 550 may forward the request at 516 to gateway 530 based on the knowledge, determined by receiving broadcast 514, that gateway 530 has the cached discovery result information. Gateway 530 may generate a discovery response using the cached information at 517 and may send it to requesting entity 510 at 518.

A similar discovery request that corresponds to (i.e., has the same discovery key field information as) the cached discovery result information stored at intermediate node 540 and gateway 530 may be transmitted by entity 520. When this request arrives at intermediate node 560, this node may forward the request at 521 to intermediate node 540 based on the knowledge, determined by receiving broadcast 513, that intermediate node 540 has the cached discovery result information. Intermediate node 540 may generate a discovery response using the cached information at 522 and may send it to requesting entity 520 at 522.

When a discovery request is forwarded or responded to by an intermediate node or a resource directory, the request and/or the response may be recorded by another intermediate node or resource directory. The recorded discovery request may serve as an indication that the requester will have the discovery response in the near term after the request has been responded to. If later a same or similar discovery request is forwarded to or received by the node or the resource directory that recorded the initial response, it may notify the requester that the previous requester that sent the initial request may have the discovery result. Alternatively, the node or the resource directory that recorded the initial response may forward the request to the previous requester. In such embodiments, in order to track the nodes that have received requests that may result in cached information at those nodes, an intermediate node and/or a resource directory may maintain records capturing such information as described herein.

Figure 6:
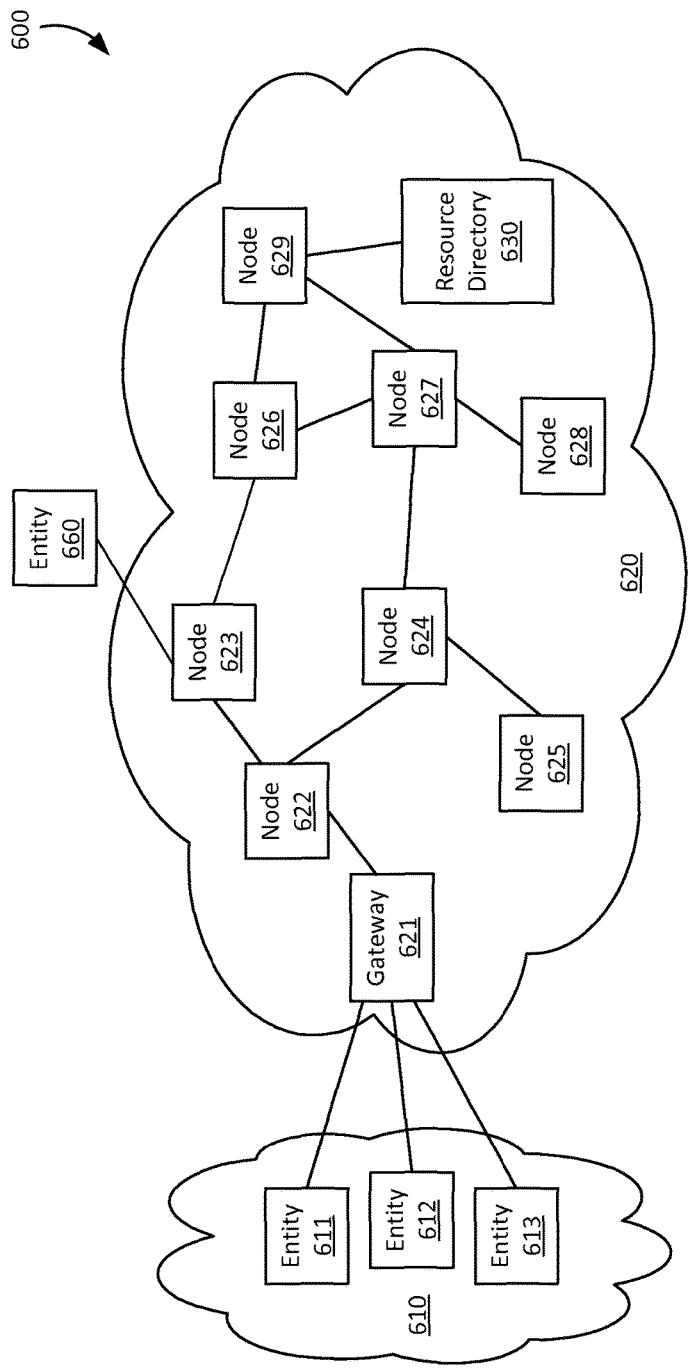
FIG. 6 illustrates an exemplary system in which embodiments of enhanced resource discovery may be implemented.

FIG. 6 illustrates an example architecture 600 that may support such embodiments. Entity 611 of edge network 610 may send a discovery request to resource directory 630. Resource directory 630 may maintain a record of this request. Note that the maintenance of such records and the processing required to determine whether to process future similar requests or direct those requests to a previous requester may consume a non-trivial amount of resources of the resource directory or other entity maintaining such records. Thus, in an embodiment, a proxy node may be used that may be configured at some location along the path to a resource directory. This proxy may maintain such records and determine whether a request will be handled by the resource directory or detoured to a previous requester to respond using a cached copy of the discovery information. For example, node 629 may serve as a proxy node as it is directly before resource directory 630. Alternatively, nodes closer to a network edge of core network 620, such as one of nodes 623, 625, 626, 628, or and/or gateway 321, may serve as a proxy node. Alternatively, a proxy node may be a dedicated device or entity that only functions as a proxy for resource directory 630. All such embodiments are contemplated as within the scope of the present disclosure.

After entity 611 sends its discovery request, entity 612 may send a subsequent discovery request having the same discovery key field information as the request sent by entity 611. Upon receipt of this request, resource directory 630 may inform entity 612 that entity 611 has the discovery result instead of processing the request and sending the result itself. Thus, entity 612 may retrieve the result from entity 611, saving resource directory 630 from using additional resources to determine the result again or pull such information from storage.

Figure 7:
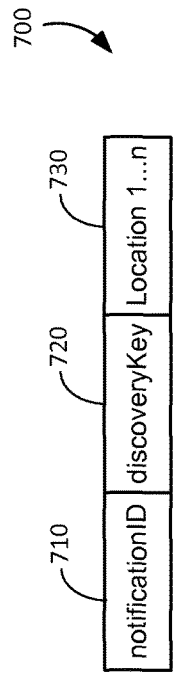
FIG. 7 illustrates an exemplary message format that may be used in embodiments of enhanced resource discovery.

In one embodiment, the message sent by resource directory 630 informing entity 612 that entity 611 has the requested discovery information may be sent in the format shown for message 700 in FIG. 7. DiscoveryKey field 720 may have the same discovery key field data as both requests, and may serve to confirm to the requester that it is the same discovery key field data as has been requested before. Location field 730 may provide an indication of one or more potential locations of entities that may have the discovery result, as determined based on recorded discovery requests. NotificationID 710 may be an identifier of message 700 that may include an identifier, such as an IP address, of the entity that originated message 700, resource directory 630 in this example.

Figure 8:
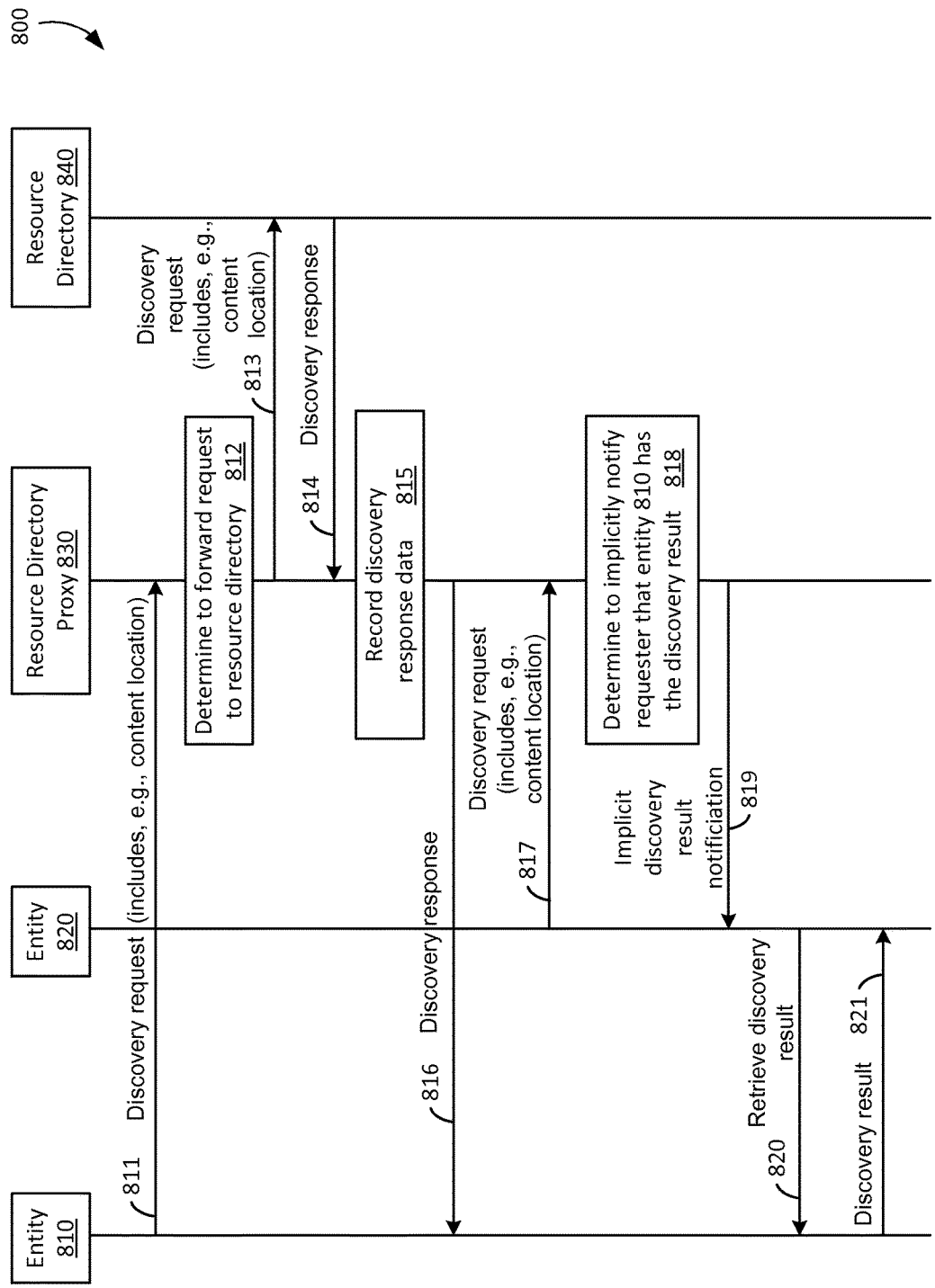
FIG. 8 illustrates a signal flow demonstrating an exemplary process for implementing embodiments of enhanced resource discovery.

FIG. 8 shows exemplary, non-limiting signal flow 800 illustrating exemplary signals and procedures for redirecting a requester to another entity that may have the requested discovery information. At 811, entity 810 may transmit a discovery request to resource directory 840. However, this request may be intercepted by resource directory proxy 830, which may be any entity or device in the network. At 812, by resource directory proxy 830 may determine that the request should be relayed to resource directory 840 based on, for example, having no record of a previous request with the same discovery key field data. The request is then relayed to resource directory 840 at 813, and discovery response 814 is transmitted to resource directory proxy 830, which, at 815, makes a record of the response being sent to entity 810. At 816 the discovery response is provided to entity 810.

Subsequently, entity 820 may transmit request 817 with the same discovery key field data as request 811. Request 817 may also be intercepted by resource directory proxy 830, which may determine at block 818 that the request may be handled by requesting entity 810 rather than resource directory 840 based on, for example, having a record of previous request 811 or the response 814 with the same discovery key field data. Resource directory proxy 830 may then transmit implicit discovery result notification 819 to entity 820, which may use the information in message 819 to determine that entity 810 should process the request. Entity 820 may then transmit request 820 to retrieve the discovery result, and may receive the result at 821.

Figure 9:
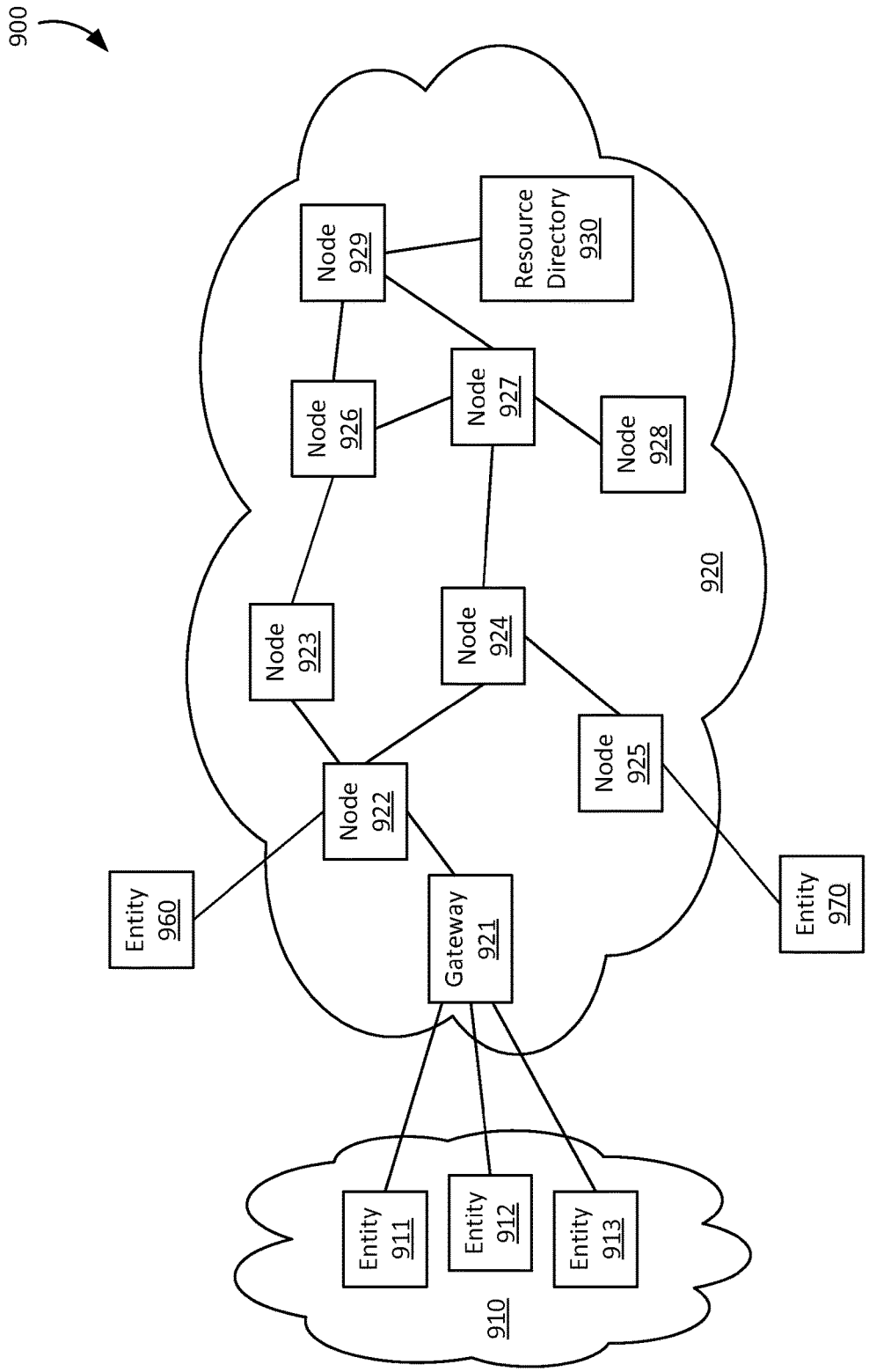
FIG. 9 illustrates an exemplary system in which embodiments of enhanced resource discovery may be implemented.

Alternatively, rather than redirecting requesters to other entities that may have the requested discovery results, in some embodiment, the requests themselves may be redirected to such entities. FIG. 9 illustrates an example architecture 900 that may support such embodiments. Entity 911 of edge network 910 may send a discovery request to resource directory 930. Node 924 may maintain a record of this request, implicitly assuming that at some point later, entity 911 will have the discovery result generated by resource directory 930 in response to the request. At a later time, entity 912 may send a similar discovery request having the same discovery key field data. This request may travel a path that may include node 924. In response to receiving this request and determining that it has a record of the request sent by entity 911 that has the same discovery key field data, node 924 may redirect the request to entity 911 rather than forwarding it to resource directory 930. Entity 911 may then reply to the request with the stored discovery result data that it received from sent from resource directory 930.

Figure 10:
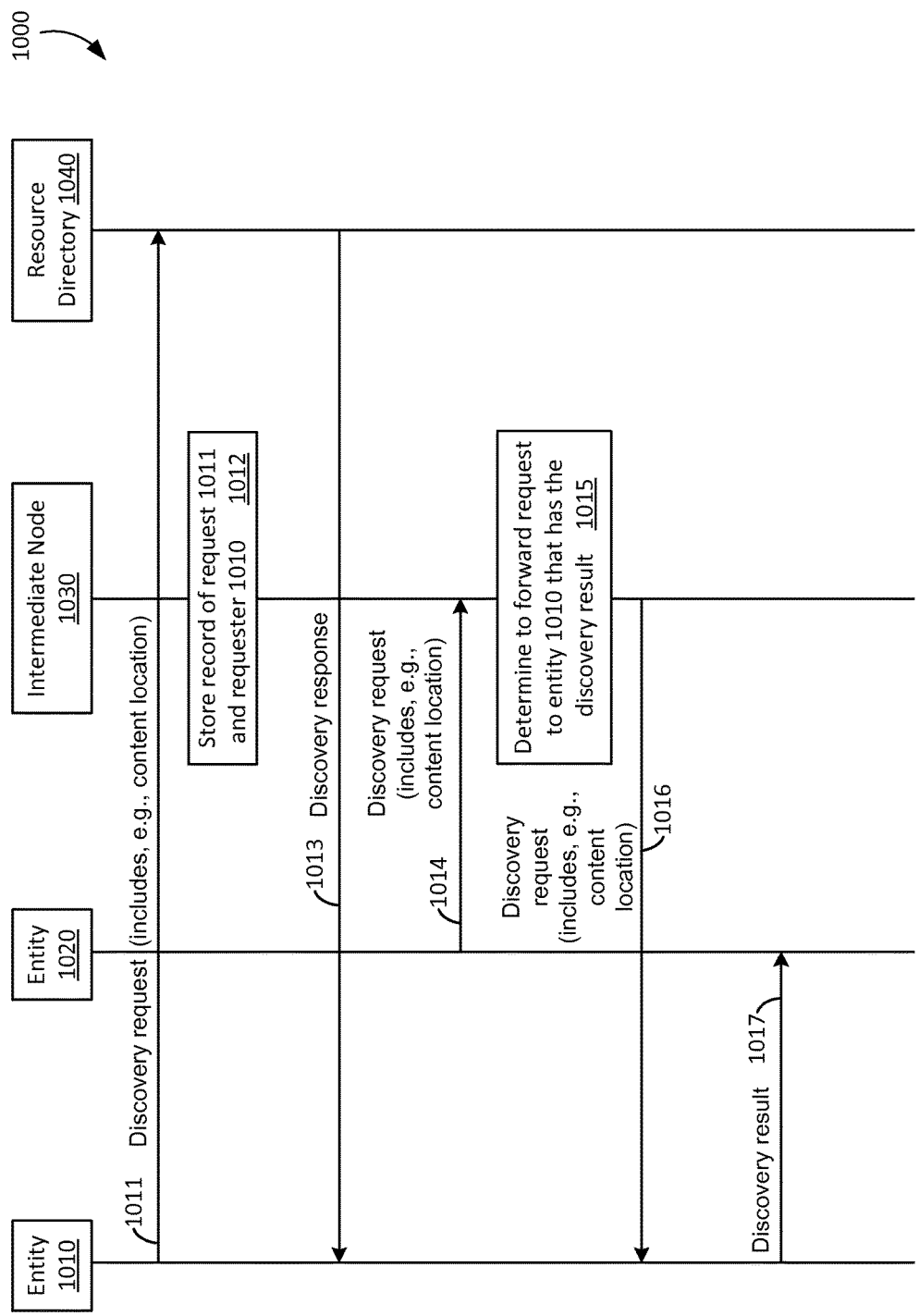
FIG. 10 illustrates a signal flow demonstrating an exemplary process for implementing embodiments of enhanced resource discovery.

FIG. 10 shows exemplary, non-limiting signal flow 1000 illustrating exemplary signals and procedures for redirecting a request to another entity that may have the requested discovery information. Entity 1010 may send discovery request 1011 to resource directory 1040. Intermediate node 1030 may be in the path between entity 1010 and resource directory 1040, and therefore may observe and store a record of request 1011 at block 1012. Subsequently, entity 1020 may send similar discovery request 1014 having the same discovery key field data as request 1011 that may also traverse intermediate node 1030. In response to receiving this request and determining, at block 1015, that it has a record of request 1011 sent by entity 1010, and that request 1011 has the same discovery key field data as request 1014, intermediate node 1030 may redirect the request as discovery request 1016 to entity 1010 rather than forwarding it to resource directory 1040. Entity 1010 may then reply to the request with discovery result 1017, sending to entity 1020 the stored discovery result data that it received from sent from resource directory 1040.

As noted herein, a cached discovery result may have a limited lifetime before it expires or becomes invalid. Thus, in an embodiment, a caching node may be configured to intelligently modify a cached discovery result in order to prolong the lifetime and/or continue to make use of such a result and avoid sending a related discovery request to a resource directory. The determination of how and when to modify a cached discovery result may be based on a content publishing message received from a content server. This message may include a content identifier associated with particular content. The content identifier may also be included in a discovery key field data of discovery requests requesting a location of the content server so that the particular content can be obtained by the requesting entity. For example, the discovery key field data may include a location of the particular content. The publishing of the particular content from a different content server may make cached discovery results incomplete. The determination of how and when to modify a cached discovery result may also, or instead, be based a content un-publishing message received from a content server. When a content server deletes particular content from its storage, it may send such a message that includes a content identifier associated with particular deleted content. The content identifier may also be included in a discovery key field data of discovery requests requesting a location of the content server so that the particular content can be obtained by the requesting entity. The un-publishing of the content from the content server may make the cached discovery result invalid.

Figure 11:
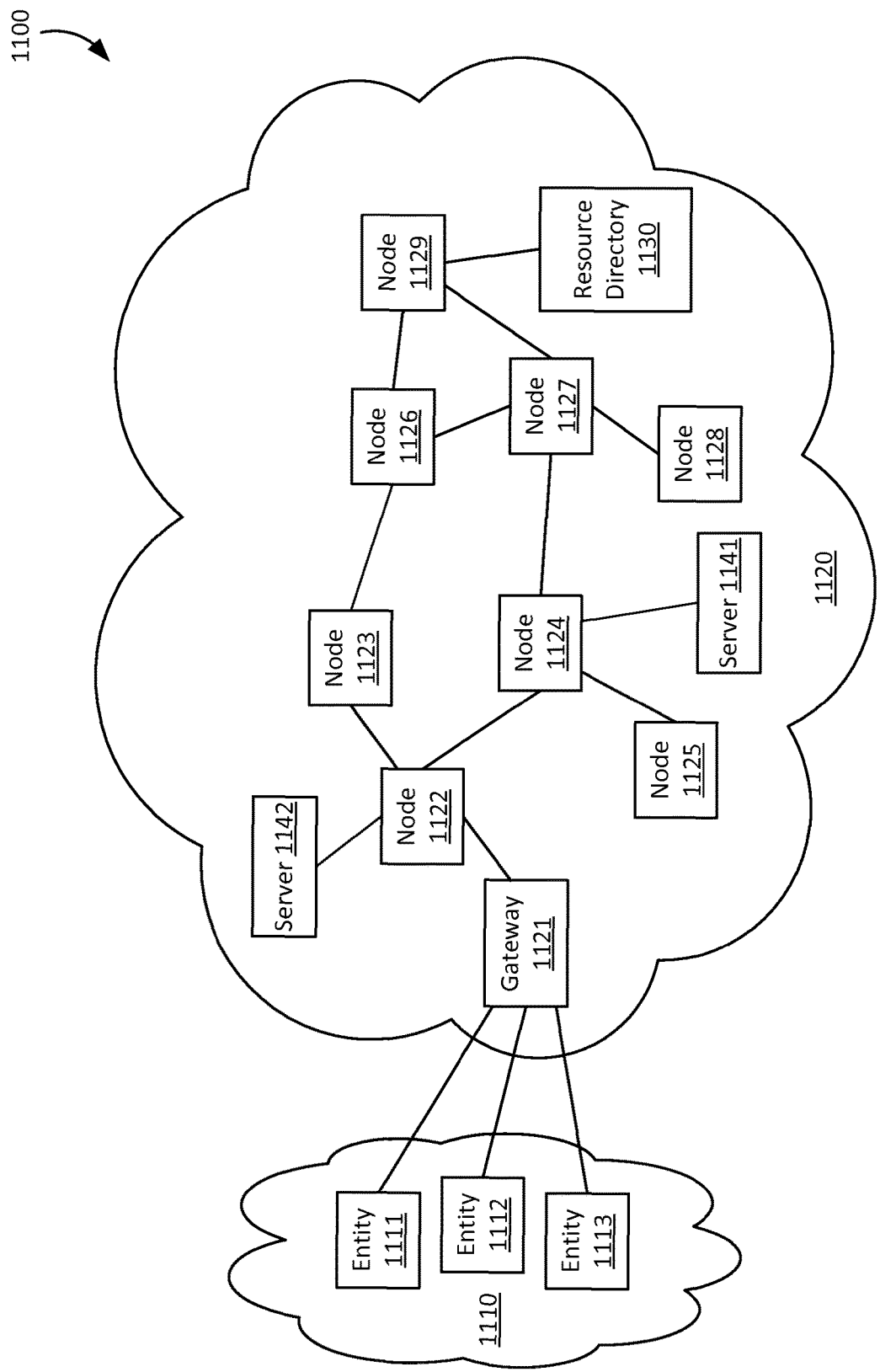
FIG. 11 illustrates an exemplary system in which embodiments of enhanced resource discovery may be implemented.

FIG. 11 illustrates an example architecture 1100 that may support such embodiments. In this example, node 1127 may have cached a discovery result indicating the location of particular content, which may be server 1142 and node 1126. Server 1141 may send a content publishing message having the same content identifier as the content identified in the discovery result cached at node 1127. This publishing information may be forwarded by nodes 1124, 1127, and 1129 to resource directory 1130. Upon detecting the content publishing message, node 1127 may modify its cached discovery result associated with the content to reflect server 1141 as an additional location of the content.

Node 1126 may subsequently delete its cached copy of the content and generate and broadcast or otherwise transmit a content un-publishing message having the same content identifier as the content identified in the discovery result cached at node 1127. Upon detecting the content un-publishing message, node 1127 may modify its cached discovery result associated with the content to remove node 1126 from the locations associated with the content.

Figure 12:
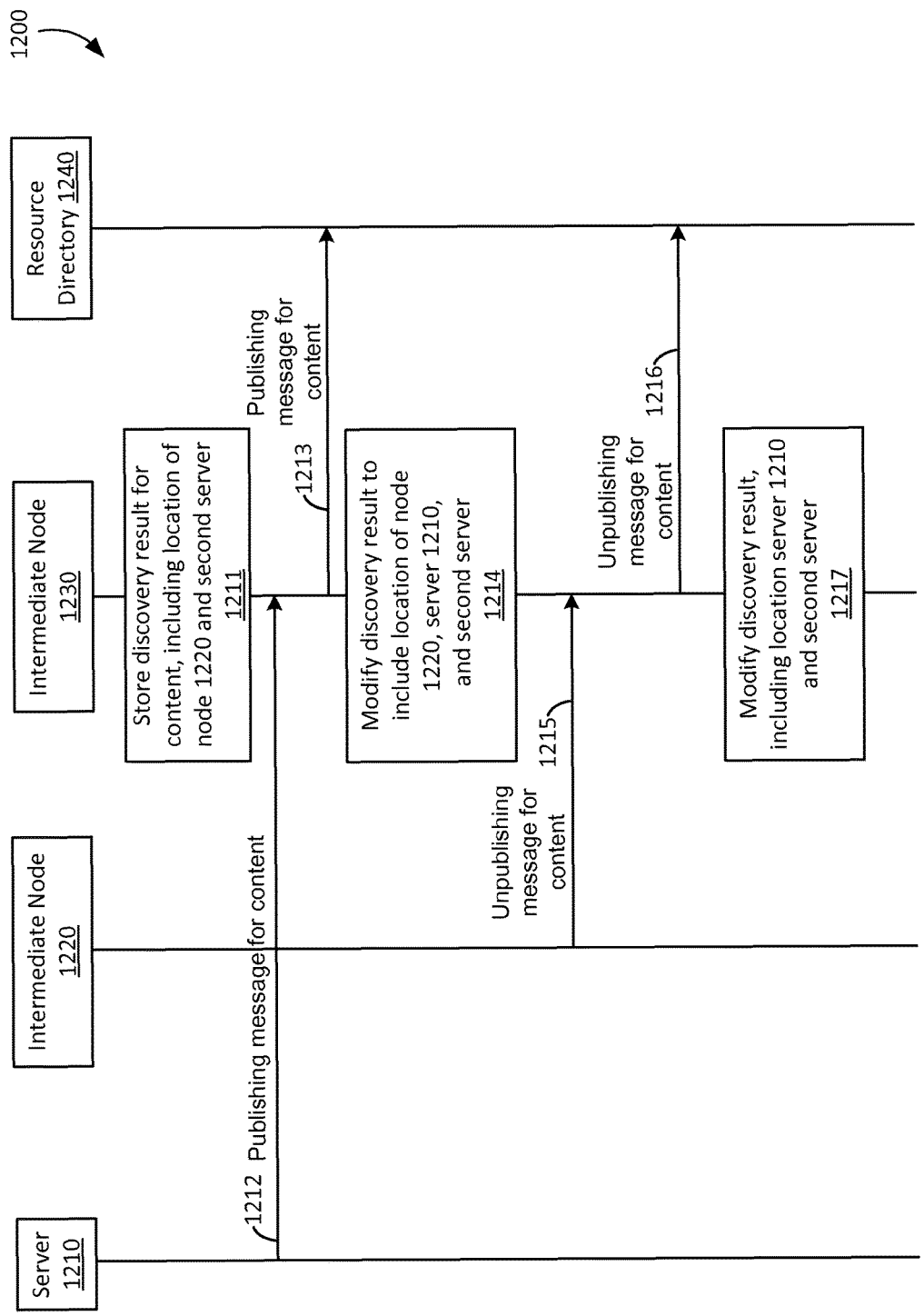
FIG. 12 illustrates a signal flow demonstrating an exemplary process for implementing embodiments of enhanced resource discovery.

FIG. 12 shows exemplary, non-limiting signal flow 1200 illustrating exemplary signals and procedures for updating cached discovery results. In this example, intermediate node 1230 may have cached, at block 1211, a discovery result of indicating the location of particular content, which may be a second server (not shown) and intermediate node 1230. Server 1210 may send content publishing message 1212 having the same content identifier as the content identified in the discovery result cached by intermediate node 1230 at block 1211. Upon detecting content publishing message 1212, node 1230 may forward the message as message 1213 to resource directory 1240 and, at block 1214, may modify its cached discovery result associated with the content to reflect server 1210 as an additional location of the content.

Intermediate node 1220 may subsequently delete its cached copy of the content and transmit content un-publishing message 1215 having the same content identifier as the content identified in the discovery result cached at node 1127. Upon detecting content un-publishing message 1215, node 1230 may forward the message as message 1216 to resource directory 1240 and, at block 1217, may modify its cached discovery result associated with the content to remove node 1220 from the locations associated with the content.

In an embodiment, discovery results may be manipulated by an intermediate node in by splitting and/or combining the discovery results. An intermediate node may split a discovery result by caching a portion of it in response to determining, for example, that the node has limited storage capability. This will allow a node to maintain at least some discovery information even when resource constrained.

In some embodiments, multiple distributed resource directories may be used. A node may forward and/or cache discovery results from multiple resource directories for discovery requests for the same resource (e.g., where the requests have the same discovery key field information). The caching node may combine such discovery results from different resource directories to be able to provide to future requesters more complete discovery result information. Combining the results may also provide a larger variety of sources for the requested resource to requesters, which may assist in balancing the load for that resource across multiple resource providers.

Figure 13:
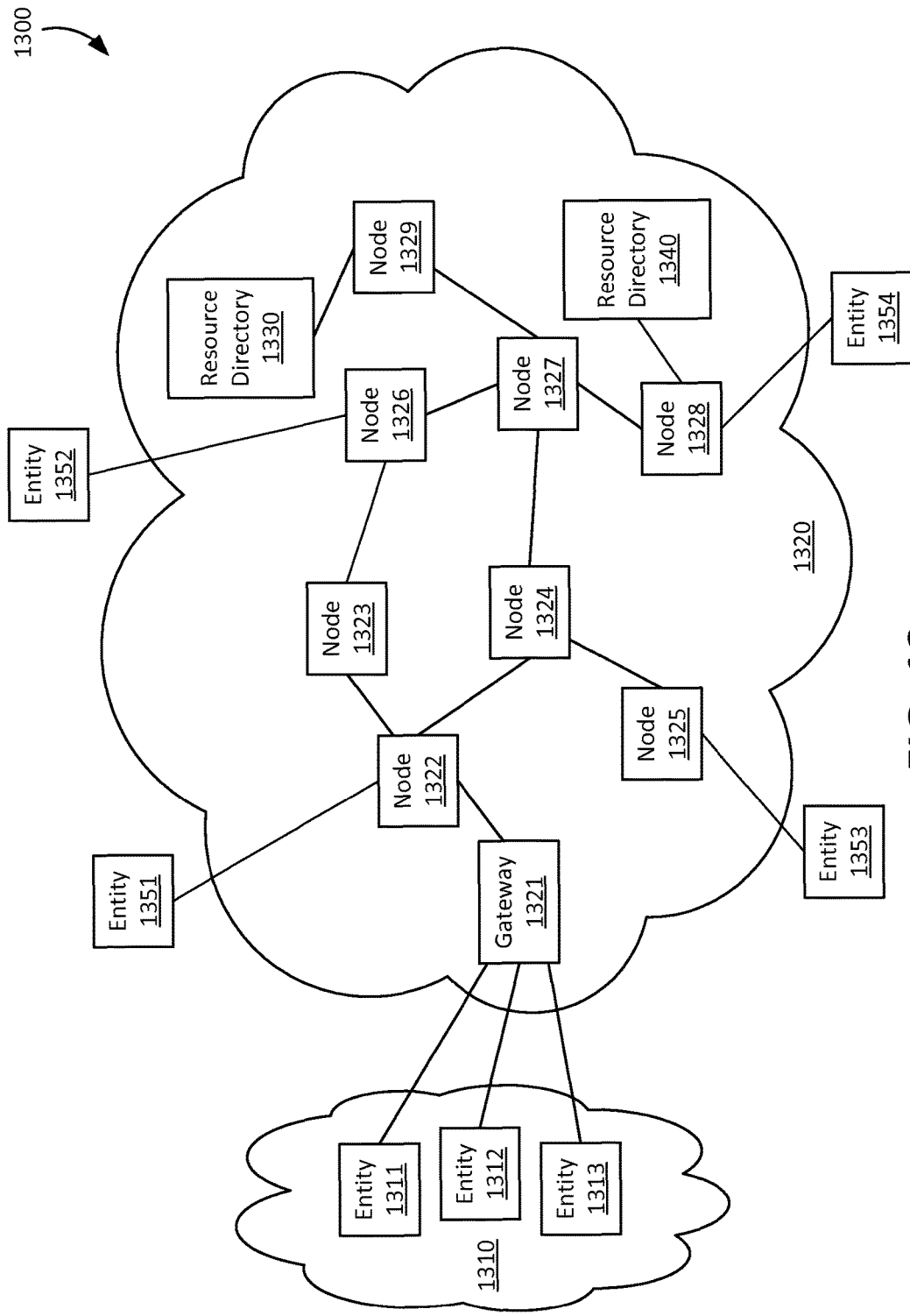
FIG. 13 illustrates an exemplary system in which embodiments of enhanced resource discovery may be implemented.

FIG. 13 illustrates an example architecture 1300 that may support such embodiments. In this example, entity 1352 may send a discovery request to the resource directory 1340 with discovery key field data indicating a location of particular content and resource directory 1340 may reply with discovery results indicating that the content's location is gateway 1321. Intermediate node 1327 may cache this discovery result.

Subsequently, entity 1354 may send a discovery request to resource directory 1330 with the same discovery key field data indicating a location of the particular content and resource directory 1330 may reply with discovery results indicating that the content's location is node 1323. Intermediate node 1327 may also cache this discovery result. Intermediate node 1327 may then combine these two discovery results into one discovery result record having discovery key field data indicating both locations of the particular content.

At a later time, entity 1353 may send a discovery request with the same discovery key field data indicating a location of the particular content to resource directory 1330. Now, when this request reaches intermediate node 1327, it is able to reply to the request with a more complete list of locations for the particular content. Entity 1353 may then elect to retrieve the content from either location. Similarly, should entity 1351 send a request with the same discovery key field data indicating a location of the particular content that traverses intermediate node 1327, this node can also reply with the more complete list of locations for the content.

Figure 14:
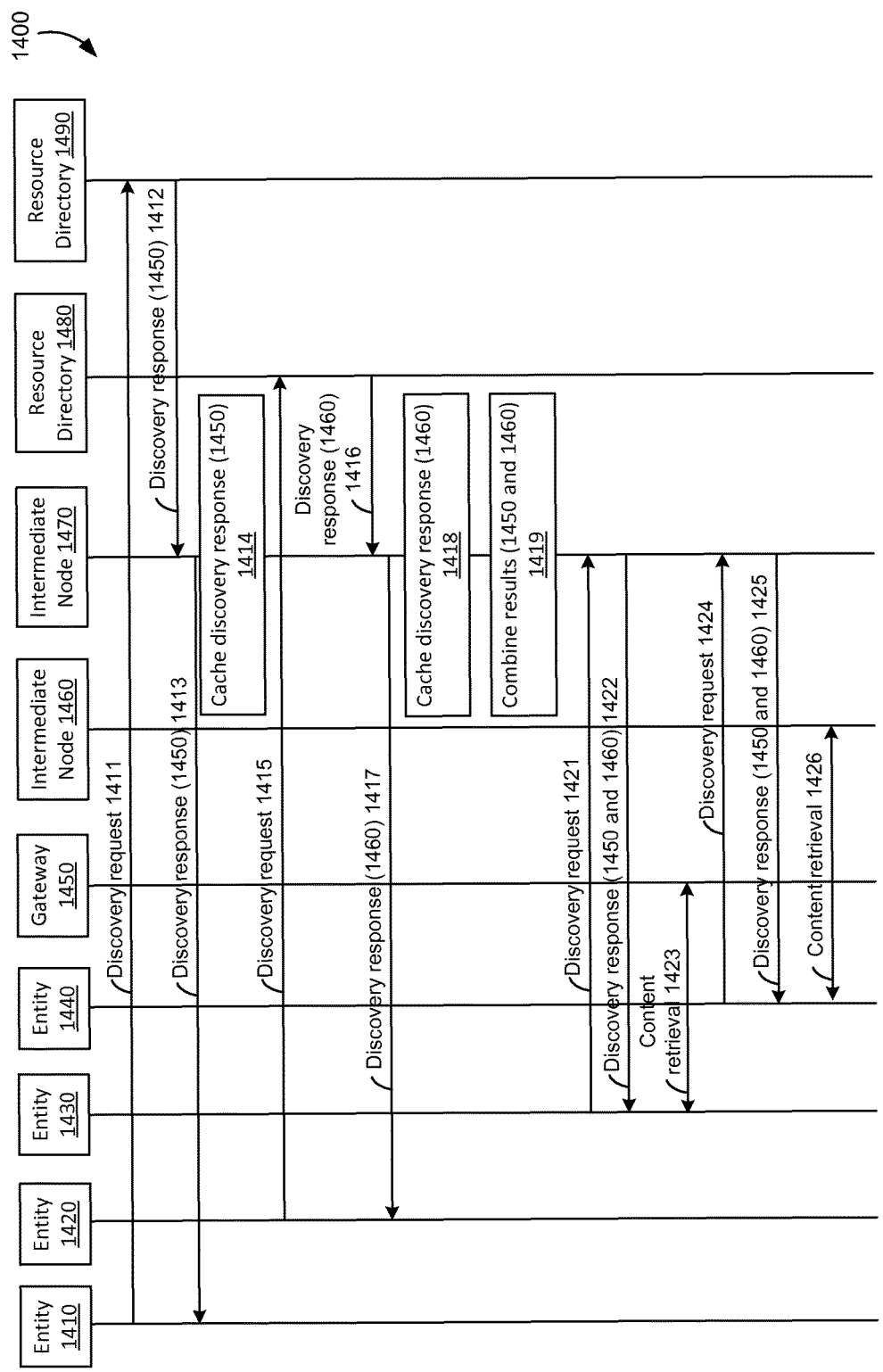
FIG. 14 illustrates a signal flow demonstrating an exemplary process for implementing embodiments of enhanced resource discovery.

FIG. 14 shows exemplary, non-limiting signal flow 1400 illustrating exemplary signals and procedures for manipulating cached discovery results. In this example, entity 1410 may send discovery request 1411 to resource directory 1490 with a discovery key field data indicating a location of particular content. Resource directory 1490 may reply with discovery response 1412 indicating that the content's location is gateway 1450. Intermediate node 1470 may forward this response to entity 1410 at 1413 and may cache this discovery result at block 1414.

Subsequently, entity 1420 may send discovery request 1415 to resource directory 1480 with the same discovery key field data indicating a location of the particular content. Resource directory 1480 may reply with discovery response 1416 indicating that the content's location is intermediate node 1460. Intermediate node 1470 may forward this response to entity 1420 at 1417 and may cache this discovery result at block 1418. At block 1419, intermediate node 1470 may then combine these two discovery results into one discovery result having discovery key field data indicating both locations of the particular content.

At a later time, entity 1430 may send discovery request 1421 with the same discovery key field data indicating a location of the particular content to either resource directory. However, when request 1421 reaches intermediate node 1470, this node may reply to the request with response 1422 having a more complete list of locations for the particular content that includes both gateway 1450 and intermediate node 1460. Entity 1430 may then elect to retrieve the content from gateway 1450 at 1423. Similarly, entity 1440 may send discovery request 1424 with the same discovery key field data indicating a location of the particular content to either resource directory. Here again, when request 1424 reaches intermediate node 1470, this node may reply to the request with response 1425 having a more complete list of locations for the particular content that includes both gateway 1450 and intermediate node 1460. Entity 1440 may then elect to retrieve the content from intermediate node 1460 at 1426.

Figure 15:
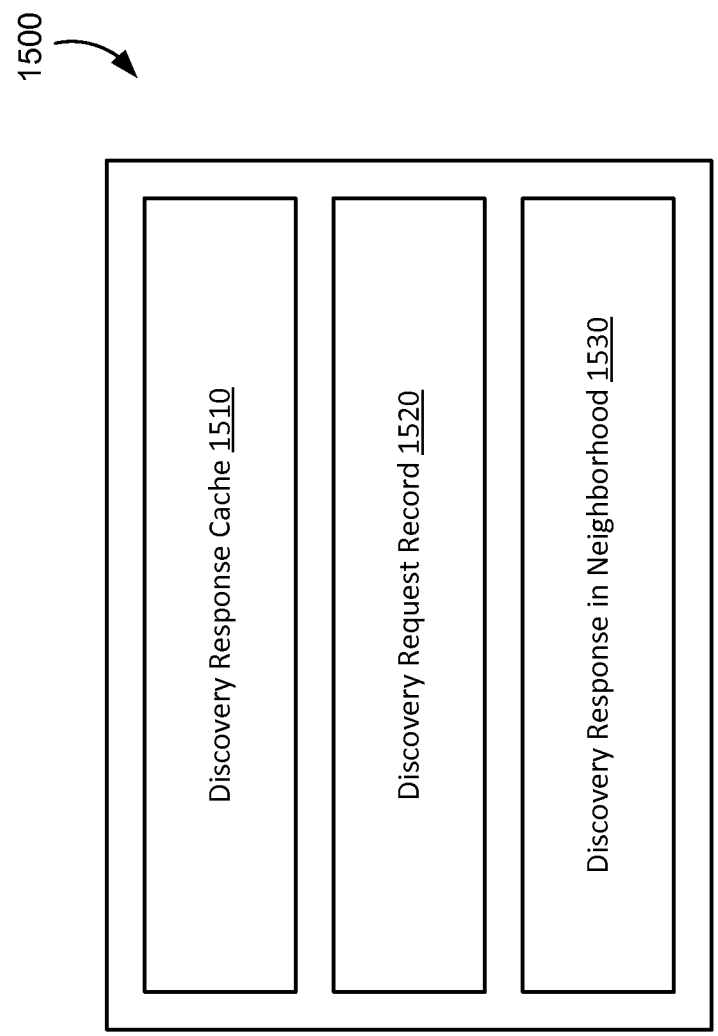
FIG. 15 illustrates an exemplary structure that may be used to store discovery data in embodiments of enhanced resource discovery.

FIG. 15 illustrates exemplary, non-limiting structure 1500 that may be used in nodes according to the disclosed embodiments to enable the various disclosed resource discovery mechanisms. Structure 1500 may be implemented in hardware, software, or a combination thereof. Structure 1500 may include a discovery response cache that may be used to store discovery results that are detected passing through the node. These results may be indexed using data in the discovery key field of such results. For discovery results that include a lifetime, upon the expiration of that lifetime, the cached discovery results may be deleted from discovery response cache 1510. Thus, in some embodiments, such results present in discovery response cache 1510 may be presumed to be valid.

Structure 1500 may also include discovery request records 1520 that may record discovery requests that are forwarded by the node implemented structure 1500, for example, to another node other than a resource directory. These records may be indexed using data in the discovery key field of such requests.

Structure 1500 may also include discovery-response-in-neighborhood 1530 that may be a record of the discovery result broadcast messages in the node's "neighborhood", which may be its network or network subsection. If a discovery result is broadcast in the neighborhood by the caching node, it may be marked with a broadcast label. When a discovery result is deleted from the discovery response cache (e.g., due to cache replacement, lifetime expiration, etc.), an update notification may be broadcast from the caching node to the neighboring nodes with the broadcast hop set to be the same as the original discovery result broadcast message. The particular record with the same discovery key field data may be removed from discovery-response-in-neighborhood 1530 if the caching node sending the update notification is the only neighbor that caches this discovery result.

Figure 16:
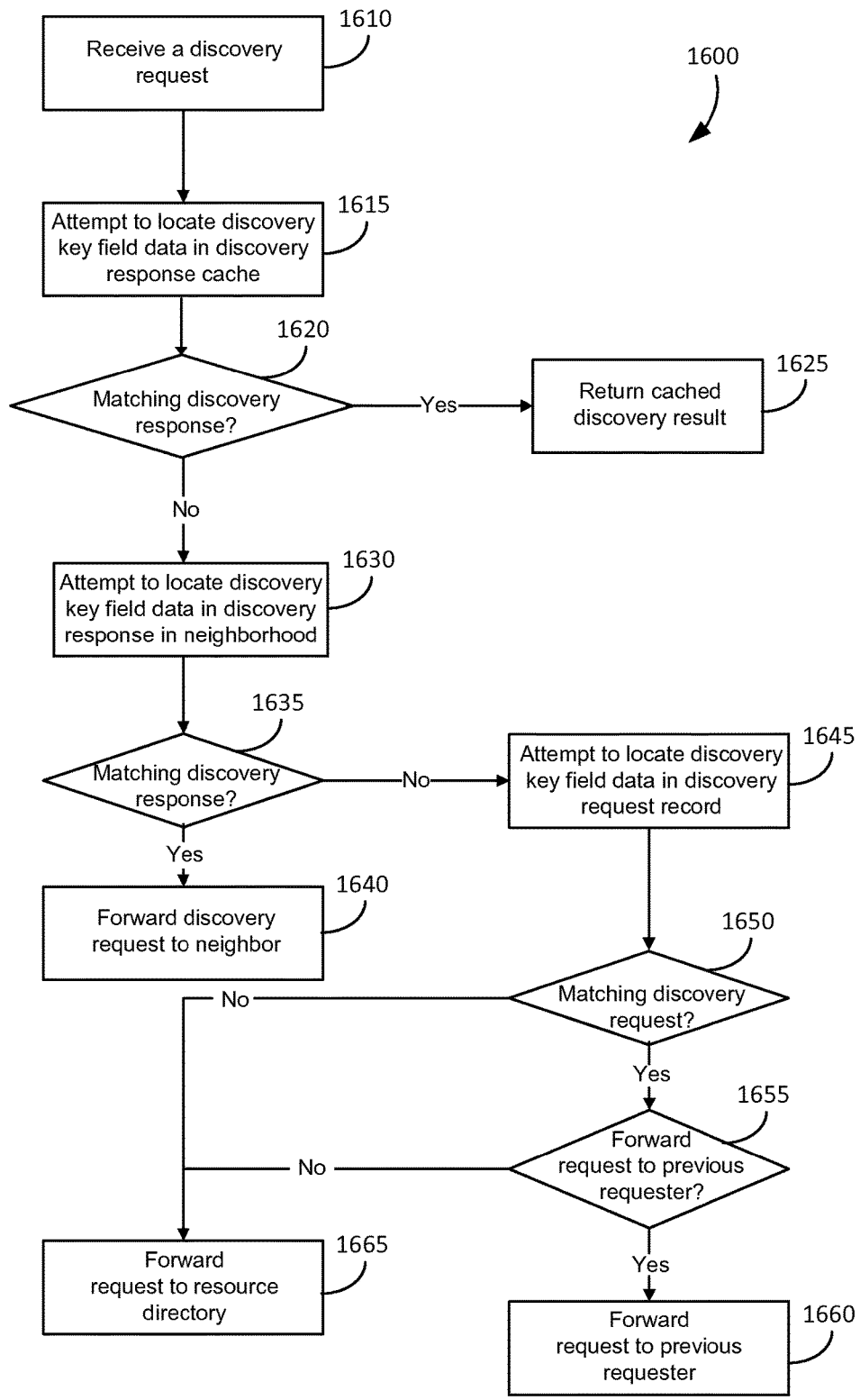
FIG. 16 illustrates an exemplary method of implementing embodiments of enhanced resource discovery.

FIG. 16 illustrates exemplary, non-limiting method 1600 of processing a discovery request according to an embodiment. Note that any of the functions, action, and/or steps disclosed in regard to method 1600 may be performed in any order, in isolation, with a subset of the disclosed functions, action, and steps, and in combination with any other functions, actions, and steps, whether disclosed herein or otherwise. All such embodiments are contemplated as within the scope of the present disclosure.

At block 1610, a node may receive a discovery request. At block 1615, the node may attempt to locate information in its discovery response cache that matches data in the discovery request's discovery key field to determine, at block 1620, whether there is a cached copy of a matching discovery response. If there is a cached copy of a matching discovery response, at block 1625 data from this copy is returned as a response to the requester.

If there is no matching discovery response, at block 1630 the node may attempt to locate information in its discovery-response-in-neighborhood that matches data in the discovery request's discovery key field to determine, at block 1635, whether there is a cached copy of a matching discovery response that was previously broadcast to the node. If a matching broadcast message is found, the node may forwards the discovery request to the neighboring node that broadcast the message with the matching discovery key field data.

If no matching broadcast message is found, at block 1645 the node may attempt to locate the information in its discovery request record that matches data in the discovery request's discovery key field to determine, at block 1650, whether a previous request for information on the same resource has been received. If so, this may indicate that a previous requester has a copy of a matching discovery response. If a matching discovery request is found, the determines at block 1655 whether to forward the discovery request to the previous requester, in some embodiments with criteria such as distances between the node and the previous requester and/or a resource directory, a resource directory's status if it is known to the node, etc. If the node decides to forward the request to the previous requester it does so at block 1660. Otherwise, at block 1665, the discovery request is forwarded to a resource directory.

Figure 17:
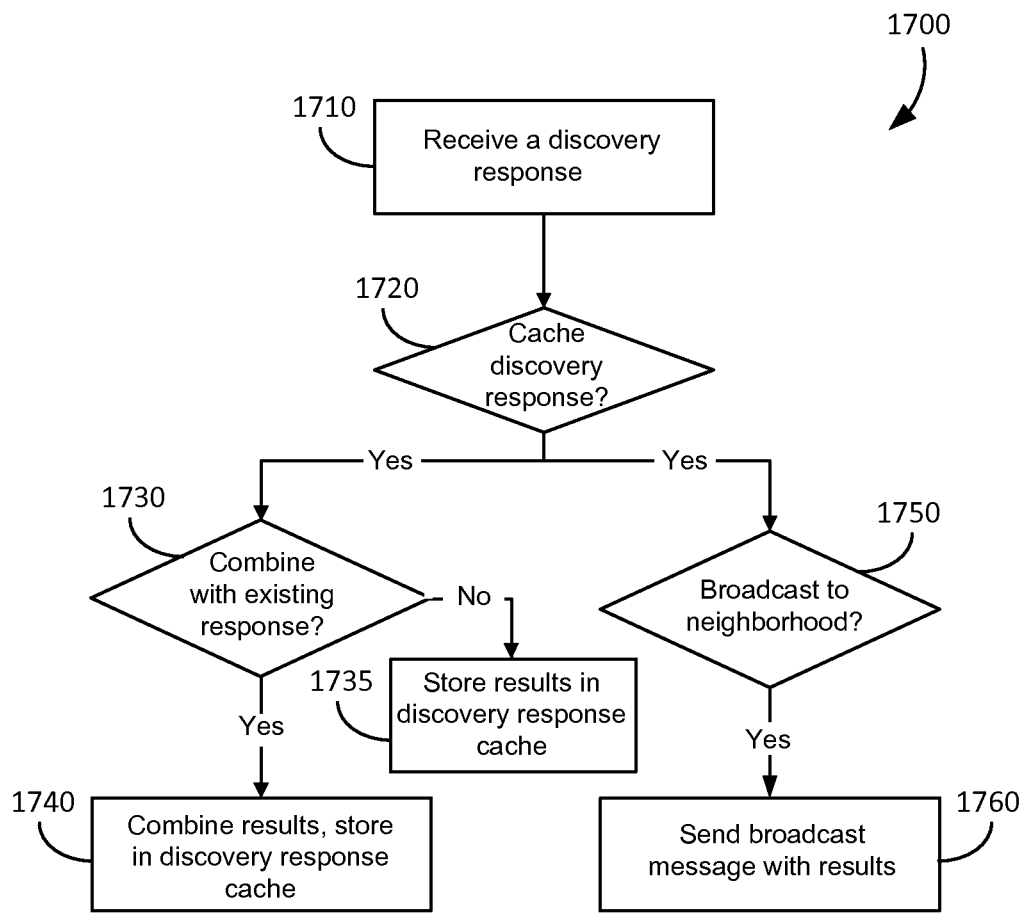
FIG. 17 illustrates an exemplary method of implementing embodiments of enhanced resource discovery.

FIG. 17 illustrates exemplary, non-limiting method 1700 of processing a discovery response according to an embodiment. Note that any of the functions, action, and/or steps disclosed in regard to method 1700 may be performed in any order, in isolation, with a subset of the disclosed functions, action, and steps, and in combination with any other functions, actions, and steps, whether disclosed herein or otherwise. All such embodiments are contemplated as within the scope of the present disclosure.

At block 1710 a discovery response may be received by a node (may be any entity in a network). At 1720, the node may determine whether to cache the discovery response. If so, there are two further determinations that may be made. At block 1730, the node may determine whether the discovery results in the response can be combined with other results already cached at the node. This may be accomplished by matching cached discovery key field data with discovery key field contained in the response. If there no such entry found, the node stores the discovery response in the discovery response cache at block 1735. If a matching entry is found, at block 1740 the entry is combined with the more recently received results and the combined entry is stored in the discovery response cache.

At block 1750, the node may also determine whether to broadcast the discovery result in the neighborhood. This determination may be made at a later time and/or periodically and applied to all stored discovery results. Criteria used for this determination may include the frequency at which the cached results are used or provided to other entities. If the node determines to broadcast the results, at block 1760 a broadcast message with the results is generated and transmitted to the node's neighborhood.

Figure 18:
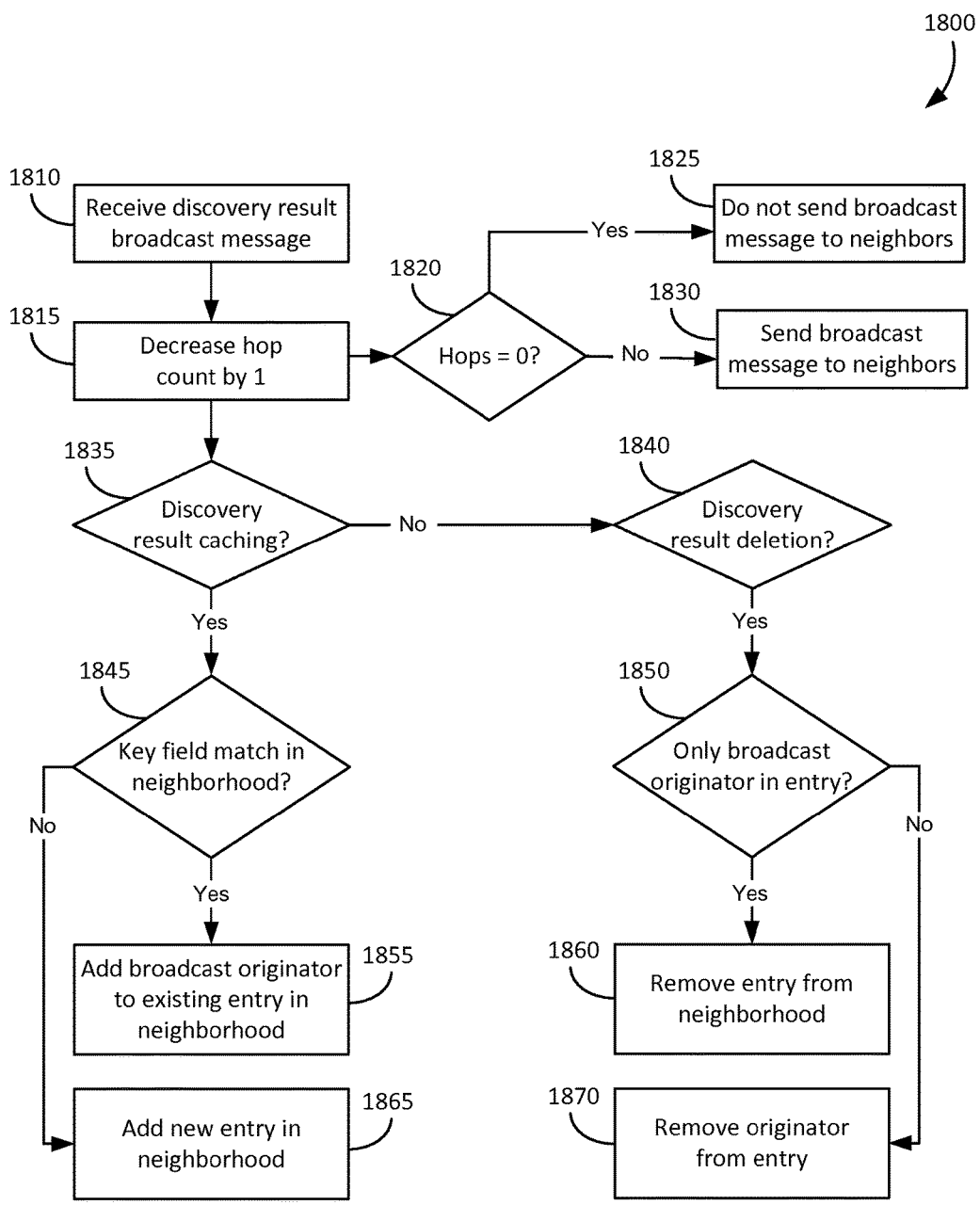
FIG. 18 illustrates an exemplary method of implementing embodiments of enhanced resource discovery.

FIG. 18 illustrates exemplary, non-limiting method 1800 of processing a received discovery result broadcast message according to an embodiment. Note that any of the functions, action, and/or steps disclosed in regard to method 1700 may be performed in any order, in isolation, with a subset of the disclosed functions, action, and steps, and in combination with any other functions, actions, and steps, whether disclosed herein or otherwise. All such embodiments are contemplated as within the scope of the present disclosure.

At block 1810 a node (may be any entity in a network) may receive a discovery result broadcast message. At block 1815, the node may decrease the hop count indicated in the message by one to determine, at block 1820, whether the hop count is now zero. If so, at block 1825 the node refrains from forwarding the broadcast message to its other neighbors. If the hop count is still greater than zero, at block 1830 the node transmits the broadcast message, modified to reflect the reduced hop count, to its neighbors.

The node may also evaluate the status field of the broadcast message to determine, at block 1835, whether the message is a caching message intended to be added to the node's entries in its discovery-response-in-neighborhood, or a deletion message intended to remove the result from the node's entries in its discovery-response-in-neighborhood. If the status indicates that the message is intended to be added to the neighborhood results, at block 1845 the node may determine whether it has any results already cached that have discovery key field data that matches that of the received broadcast message. If so, at block 1855 the node may add the results from the broadcast message to the existing matching entry in its discovery-response-in-neighborhood. If not, at block 1865 the node may create and add a new entry in its discovery-response-in-neighborhood for the broadcast message results.

If the status indicates that the message is a deletion message intended to remove the result from the node's entries in its discovery-response-in-neighborhood, at block 1850 the node may determine whether the originator of the received broadcast message is the only cached entry in the discovery-response-in-neighborhood that matches the discovery key field data of the received broadcast message. If so, at block 1860 the node may remove the entry from its discovery-response-in-neighborhood. If there are other entities associated with the entry that matches the discovery key field data of the received broadcast message, at block 1870 the node may remove just the originator from the entry and leave the remaining data of the entry in its cache.

Figure 19:
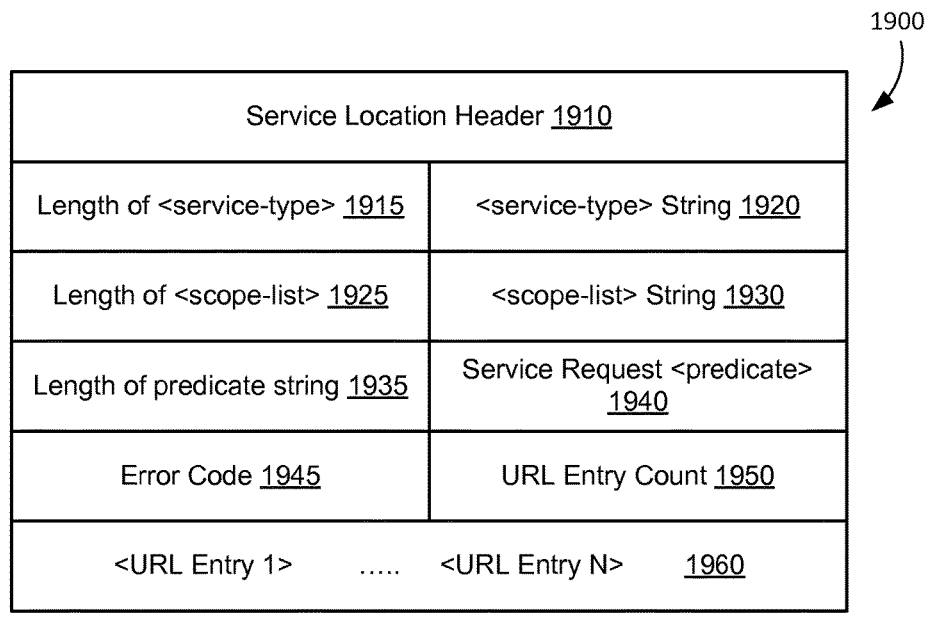
FIG. 19 illustrates an exemplary message format that may be used in embodiments of enhanced resource discovery.

The disclosed embodiments may be implemented using the Service Location Protocol (SLP). In SLP, services may be discovered based on a service type and scope or based on services that satisfy a specified predicate. Thus, in SLP implementations, discovery key field data for SLP discovery messages may include one or more of type, scope, predicate, and any combination thereof. Exemplary, non-limiting SLP service reply message 1900 according to an embodiment is shown in FIG. 19. Service reply message 1900 may include service location header 1910, length of service type 1915, service type string 1920, length of scope list 1925, scope list string 1930, length of predicate string 1935, service request predicate 1940, error code 1945, URL entry count 1950, and listing of Universal Resource Locator (URL) entries 1960. Note that the inclusion and/or contents of the service type, scope list, and predicate that are included in message 1900 may be dependent on the discovery key field data of the originating request message that caused the generation of service reply message 1900.

Figure 20:
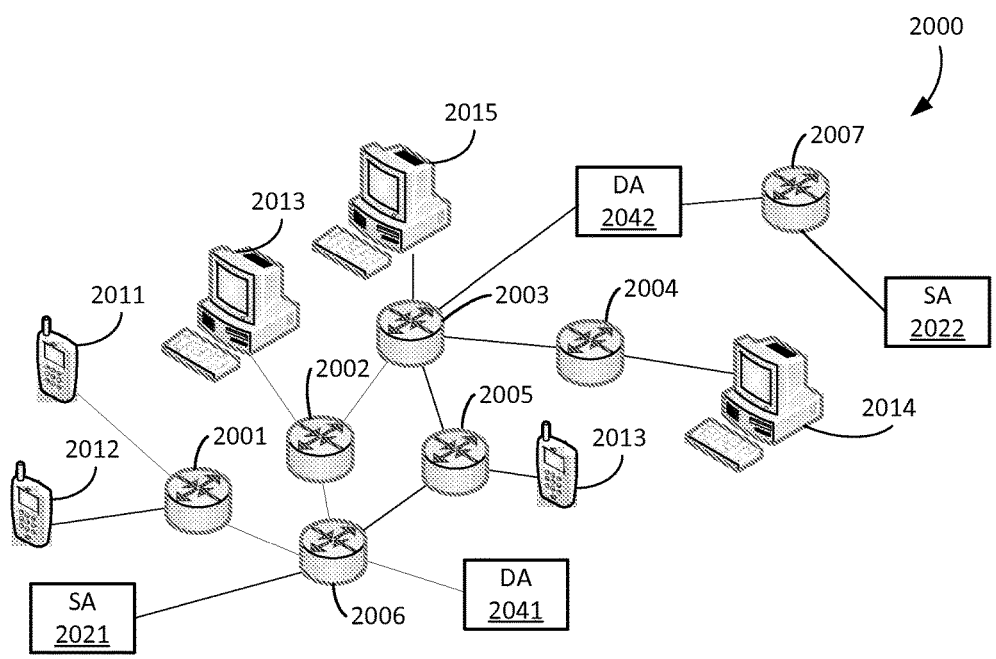
FIG. 20 illustrates an exemplary system in which embodiments of enhanced resource discovery may be implemented.

FIG. 20 shows network configuration 2000 that may be used in an exemplary embodiment of SLP service discovery. Each of user agents (UAs) 2011-2014 may communicate with one or more of directory agents (DAs) 2041 and 2042 for service discovery. Service agent (SA) 2021 may communicate with the DA 2041 for service registration while SA 2022 may communicate with DA 2042 for service registration. These communications may be facilitated by network nodes 2001-2007.

In an example, services having the URLs "service:device:sensor1://temperature", "service:device:sensor2://temperature", and "service:device:sensor1://humidity" may be registered to DA 2041 by SA 2021. Services having the URLs "service:device:sensor3://humidity", "service:device:sensor4://humidity", and "service:device:sensor5://temperature" may be registered to DA 2042 by SA 2022. These services, and locations of the service agents providing them, may be discovered using the disclosed embodiments that may provide more efficient discovery processes with lower overhead for entities involved than is currently possible using SLP.

For example, US 2011 may send a service discovery request to DA 2041 with a service type set to indicate temperature. DA 2041 may return a discovery reply that includes the URLs "service:device:sensor1://temperature" and "service:device:sensor2://temperature". Node 2002 may cache this discovery result (e.g., storing in its discovery response cache) as shown below in Table 1 (Discovery Result Caching).

TABLE 1

Cached Discovery Results

| discoveryKey | Discovery Result |
| --- | --- |
| Service-type: temperature | service:device:sensor1://temperature<br>service:device:sensor2://temperature |

UA 2012 may send a service discovery request to DA 2041 with the same service type (i.e., service type set to temperature). Node 2001 may forward this request to US 2011, which may be implicitly assumed to have the discovery result because node 2001 may have made a record of UA 2001's previous discovery request in its discovery request record cache. UA 2001 may reply to UA 2012 with its locally cached discovery result.

UA 2013 may sends a service discovery request to DA 2041 with the service type also set to temperature. Node 2002 may forward this service discovery request to node 2006 that may reply to the request with its locally cached discovery result rather than forwarding to DA 2041. Node 2002 may caches this discovery result in its discovery response cache as it traverses that node. Node 2002's discovery response cache may now also reflect, at least in part, the contents of Table 1 above. Node 2002 may also broadcast the recently cached discovery result to neighbor node 2003.

US 2015 may send a service discovery request to DA 2041 with a same service type (i.e., set to temperature).

When node 2003 receives this service discovery request, it may determine that it has a cached discovery result received from node 2002 stored in its discovery-response-in-neighborhood cache, and therefore it may forward the request to node 2002 instead of to node 2005 and towards DA 2041. Node 2002 may reply to the forwarded service discovery request with its locally cached discovery result.

SA 2021 may sends a new service registration to DA 2041 with the URL "service:device:sensor6://temperature". This registration information may reaches node 2006 that may intelligently modifies a cached discovery result as shown in below in Table 2.

TABLE 2

Cached Discovery Results

| discoveryKey | Discovery Result |
| --- | --- |
| Service-type: temperature | service:device:sensor1://temperature<br>service:device:sensor2://temperature<br>service:device:sensor6://temperature |

UA 2013 may send a service discovery request to DA 2041 with a service-type set to temperature. Node 2006 may respond to UA 2013 and provide the discovery results reflected in Table 2.

US 2015 may send a service discovery request to DA 2041 with a service-type set to humidity. DA 2041 may reply to UA5 with a service reply that includes the service URL "service:device:sensor1://humidity". Node 2003 may cache this discovery as it traverses that node, as shown in Table 3 below.

TABLE 3

Cached Discovery Results

| discoveryKey | Discovery Result |
| --- | --- |
| Service-type: humidity | service:device:sensor1://humidity |

UA 2013 may then send a service discovery request to DA 2042 with a service-type also set to humidity. DA 2042 may reply to UA 2013 with a service reply that includes the service URLs of "service:device:sensor3://humidity" and "service:device:sensor4://humidity". Node 2003 may also cache this discovery reply and combine the two discovery results as shown below in Table 4.

TABLE 4

Cached Discovery Results

| discoveryKey | Discovery Result |
| --- | --- |
| Service-type: humidity | service:device:sensor1://humidity<br>service:device:sensor3://humidity<br>service:device:sensor4://humidity |

UA 2014 may send a service discovery request to DA 2042 with a service-type set to humidity as well. UA 2014 may now obtain complete discovery results from node 2003 using mechanisms disclosed herein.

Figure 21A:
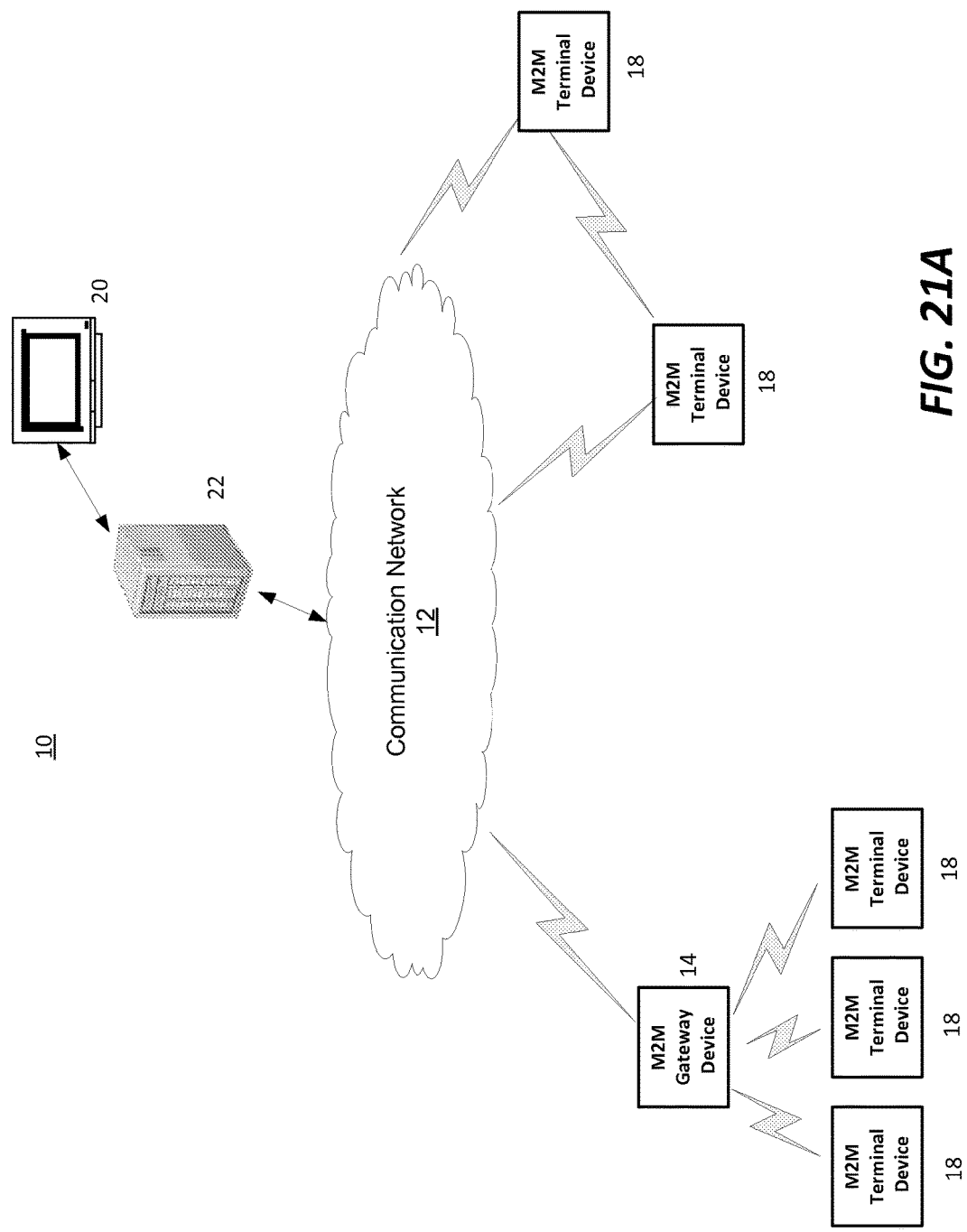
FIG. 21A is a system diagram of an example machine-to-machine (M2M) or Internet of Things (IoT) communication system in which one or more disclosed embodiments may be implemented.

FIG. 21A is a diagram of an example M2M or IoT communication system 10 in which one or more disclosed embodiments of systems and methods for enhanced discovery may be implemented. Generally, M2M technologies provide building blocks for the IoT, and any M2M device, gateway, or service platform may be a component of the IoT as well as an IoT service layer, etc.

As shown in FIG. 21A, the M2M/IoT communication system 10 includes a communication network 12. The communication network 12 may be a fixed network or a wireless network (e.g., WLAN, cellular, or the like) or a network of heterogeneous networks. For example, the communication network 12 may comprise of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 21A, the M2M/IoT communication system 10 may include an M2M gateway device 14, and M2M terminal devices 18. It will be appreciated that any number of M2M gateway devices 14 and M2M terminal devices 18 may be included in the M2M/IoT communication system 10 as desired. Each of the M2M gateway devices 14 and M2M terminal devices 18 may be configured to transmit and receive signals via the communication network 12 or direct radio link. The M2M gateway device 14 allows wireless M2M devices (e.g., cellular and non-cellular) as well as fixed network M2M devices (e.g., PLC) to communicate either through operator networks, such as the communication network 12, or through direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service platform 22, as described below. M2M devices 18 and gateways 14 may communicate via various networks including, cellular, WLAN, WPAN (e.g., Zigbee, 6LoWPAN, Bluetooth), direct radio link, and wireline for example. Any of the entities described herein, such as resource directories, gateways, proxies, servers, UAs, DAs, SAs, any nodes of any other type, and any other disclosed entities, may be implemented, executed, or otherwise enabled, partially or entirely, on devices such as M2M devices 18, gateways 14, and service platform 22. For example, gateways 121, 240, and the other gateways described herein may each be a gateway such as gateway 14. Likewise, entities 111, 112, and the like described herein may each be a device such as M2M device 18, or implemented on such a device. All such embodiments are contemplated as within the scope of the present disclosure.

The illustrated M2M service platform 22 provides services for the M2M application 20, M2M gateway devices 14, M2M terminal devices 18, and the communication network 12. It will be understood that the M2M service platform 22 may communicate with any number of M2M applications, M2M gateway devices 14, M2M terminal devices 18, and communication networks 12 as desired. The M2M service platform 22 may be implemented by one or more servers, computers, or the like. The M2M service platform 22 provides services such as management and monitoring of M2M terminal devices 18 and M2M gateway devices 14. The M2M service platform 22 may also collect data and convert the data such that it is compatible with different types of M2M applications 20. The functions of the M2M service platform 22 may be implemented in a variety of ways, for example as a web server, in the cellular core network, in the cloud, etc.

Figure 21B:
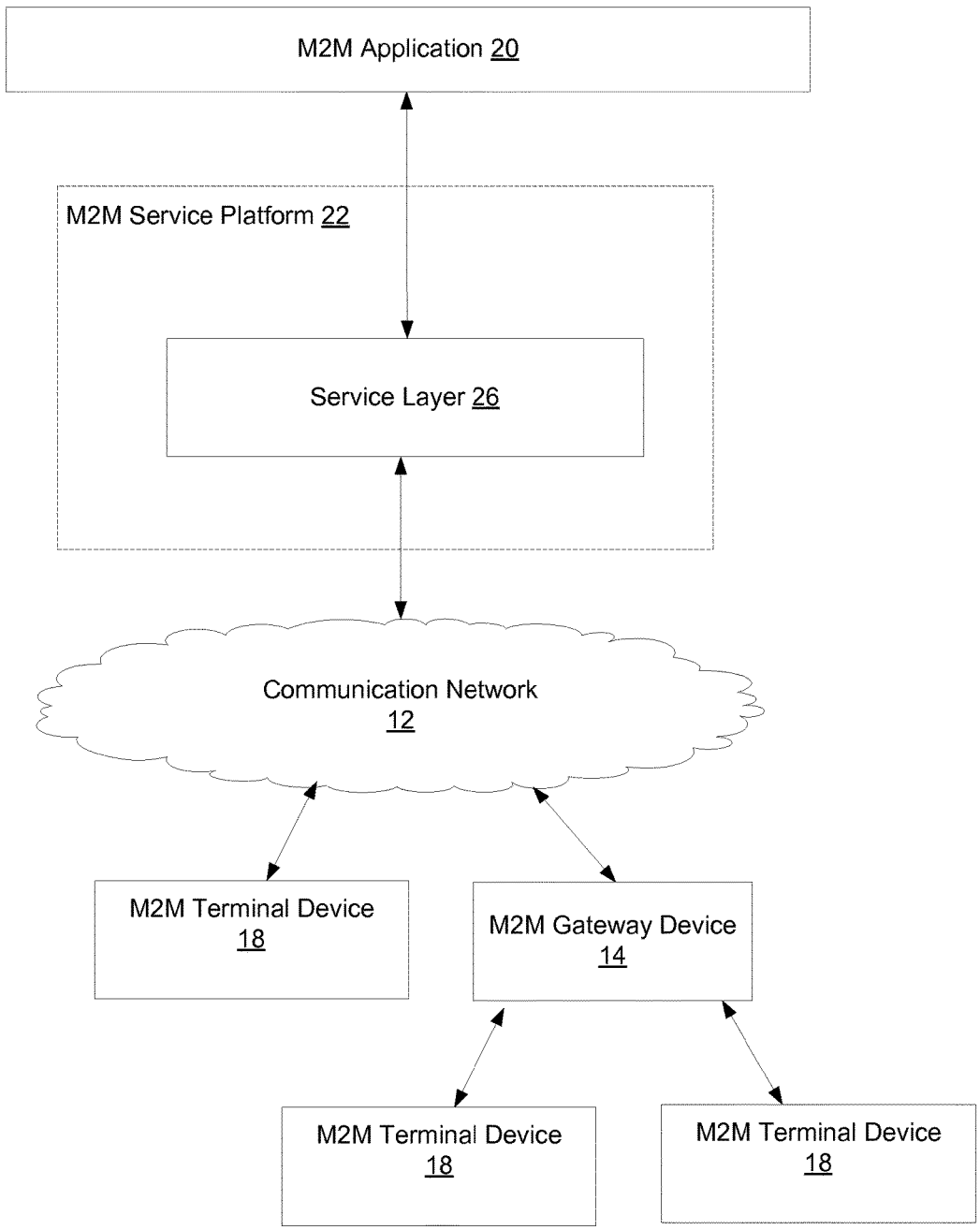
FIG. 21B is a system diagram of an example architecture that may be used within the M2M/IoT communications system illustrated in FIG. 12A.

Referring also to FIG. 21B, the M2M service platform typically implements a service layer 26 (e.g. a network service capability layer (NSCL) as described herein) that provides a core set of service delivery capabilities that diverse applications and verticals can leverage. These service capabilities enable M2M applications 20 to interact with devices and perform functions such as data collection, data analysis, device management, security, billing, service/device discovery, etc. Essentially, these service capabilities free the applications of the burden of implementing these functionalities, thus simplifying application development and reducing cost and time to market. The service layer 26 also enables M2M applications 20 to communicate through various networks 12 in connection with the services that the service layer 26 provides.

In some embodiments, M2M applications 20 may include desired applications that form the basis for creation of one or more peer-to-peer networks that include devices that may use the disclosed of systems and methods for enhanced discovery. M2M applications 20 may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20. The applications with which the described service layer and objects interact may be applications such as those of M2M applications 20.

Figure 21C:
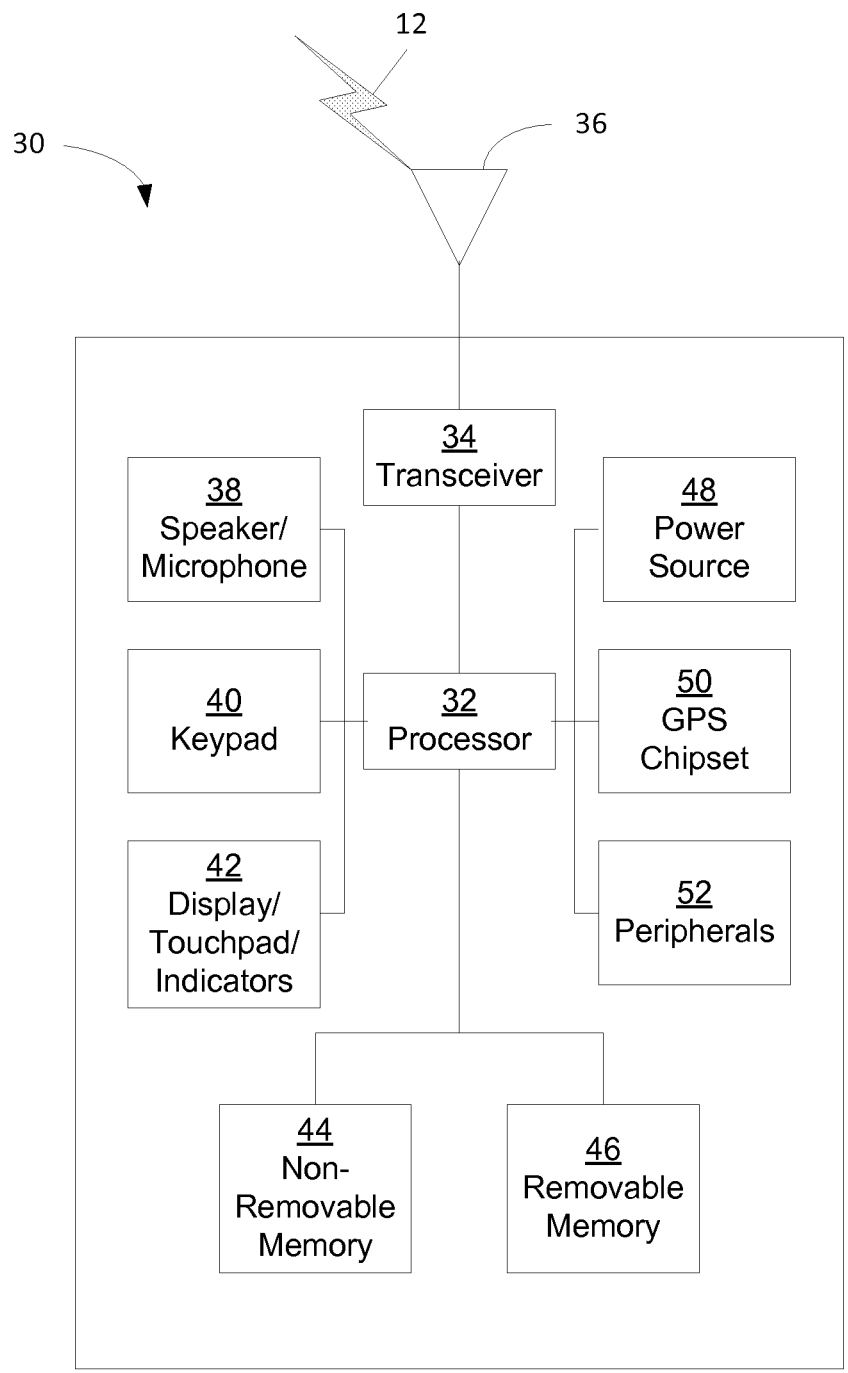
FIG. 21C is a system diagram of an example M2M/IoT terminal or gateway device that may be used within the communications system illustrated in FIG. 12A.

FIG. 21C is a system diagram of an example M2M device 30, such as an M2M terminal device 18 or an M2M gateway device 14 for example. As shown in FIG. 21C, the M2M device 30 may include a processor 32, a transceiver 34, a transmit/receive element 36, a speaker/microphone 38, a keypad 40, a display/touchpad/indicators (e.g., one or more light emitting diodes (LEDs)) 42, non-removable memory 44, removable memory 46, a power source 48, a global positioning system (GPS) chipset 50, and other peripherals 52. It will be appreciated that the M2M device 40 may include any sub-combination of the foregoing elements while remaining consistent with an embodiment. This device may be a device that uses the disclosed systems and methods for enhanced discovery.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the M2M device 30 to operate in a wireless environment. The processor 32 may be coupled to the transceiver 34, which may be coupled to the transmit/receive element 36. While FIG. 21C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access layer and/or application layer for example.

The transmit/receive element 36 may be configured to transmit signals to, and/or receive signals from, an M2M service platform 9. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 21C as a single element, the M2M device 30 may include any number of transmit/receive elements 36. More specifically, the M2M device 30 may employ MIMO technology. Thus, in an embodiment, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the M2M device 30, such as on a server or a home computer. The processor 32 may be configured to control lighting patterns, images, or colors on the display or indicators 42 in response to various conditions and parameters, such as those described in some of embodiments set forth herein.

The processor 32 may receive power from the power source 48, and may be configured to distribute and/or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the M2M device 30. It will be appreciated that the M2M device 30 may acquire location information by way of any suitable location-determination method while remaining consistent with an embodiment.

The processor 32 may further be coupled to other peripherals 52 that may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 21D:
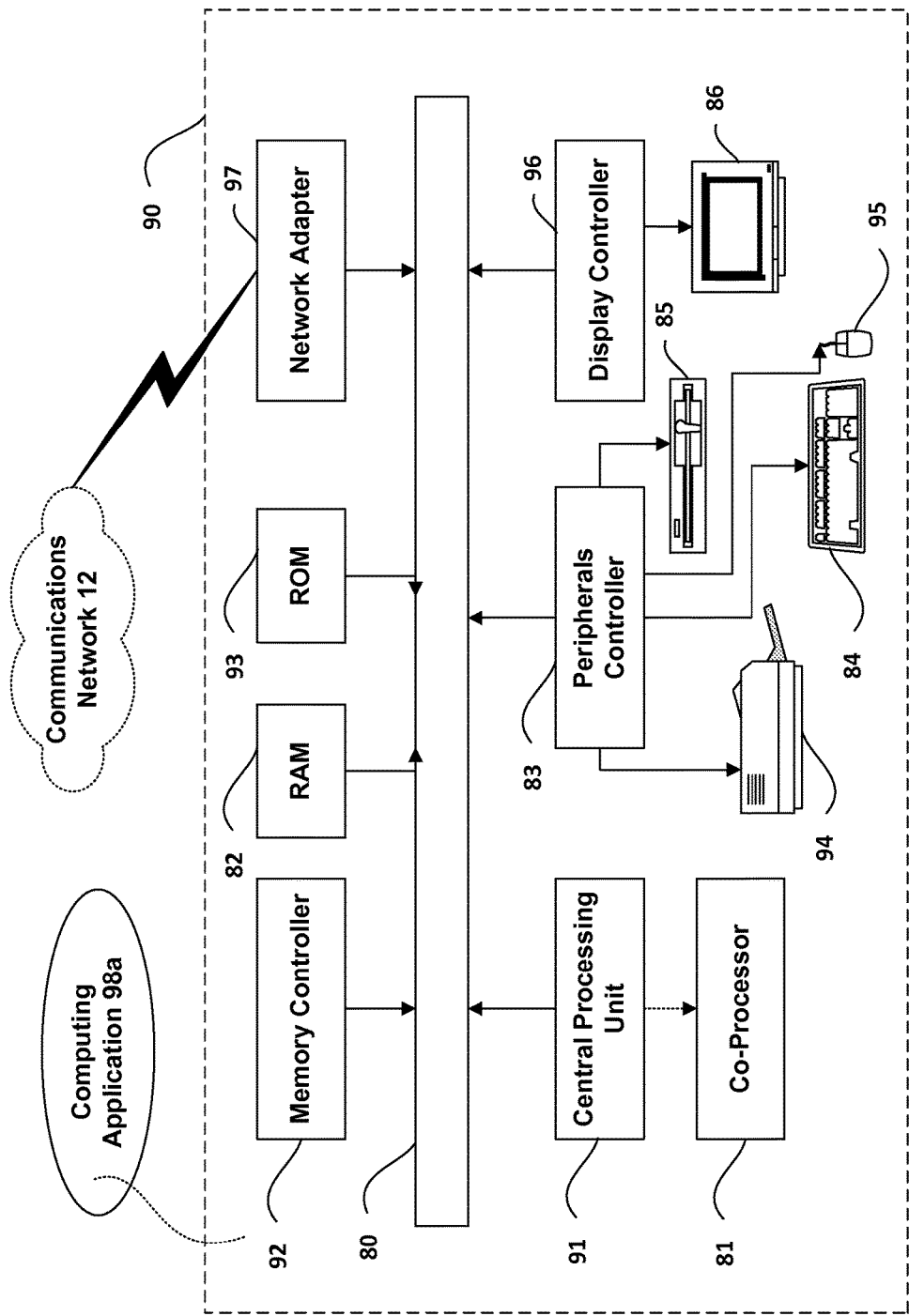
FIG. 21D is a block diagram of an example computing system in which aspects of the communication system of FIG. 12A may be embodied.

FIG. 21D is a block diagram of an exemplary computing system 90 on which, for example, the M2M service platform 22 of FIGS. 21A and 21B may be implemented. Computing system 90 may comprise a computer or server and may be controlled primarily by computer readable instructions that may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for enhanced discovery.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 21A and 21B. In an embodiment, network adaptor 97 may receive and transmit data related to the disclosed systems and methods for enhanced discovery.

It is understood that any or all of the systems, methods, and processes described herein may be embodied in the form of computer executable instructions (i.e., program code) stored on a computer-readable storage medium embodied as a physical device or apparatus. Such instructions, when executed by a machine, or a processor configured in a machine, such as a computer, server, M2M terminal device, M2M gateway device, or the like, effectuate, perform, and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium that can be used to store the desired information and that can be accessed by a computer.

In describing preferred embodiments of the subject matter of the present disclosure, as illustrated in the figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   receiving a first discovery request from a first entity at a network node in a network of connected entities;
   transmitting the first discovery request from the network node to a resource directory entity;
   receiving a first discovery response at the network node from the resource directory entity;
   storing first discovery response data at the network node based on the first discovery response;

transmitting the first discovery response from the network node to the first entity;
receiving a second discovery request from a second entity at the network node;
determining, at the network node, that discovery request data of the second discovery request corresponds to the first discovery response data; and
transmitting, from the network node, a second discovery response comprising the first discovery response data to the second entity and a notification to the resource directory entity indicating that the network node transmitted the second discovery response comprising the first discovery response data to the second entity.

2. The method of claim 1, further comprising:
determining that discovery request data of a third discovery request corresponds to the first discovery response data; and
transmitting a third discovery response comprising a location of the first entity to a third entity.

3. The method of claim 1, further comprising:
determining that discovery request data of a third discovery request corresponds to the first discovery response data; and
transmitting the third discovery request to the first entity.

4. The method of claim 1, further comprising:
receiving a third discovery response from a third entity;
determining that a first subset of second discovery response data received in the third discovery response corresponds to a first subset of the first discovery response data; and
storing a second subset of the second discovery response data by modifying the first discovery response data to include the second subset of the second discovery response data.

5. The method of claim 1, further comprising:
receiving a third discovery response from a third entity;
determining a first subset of second discovery response data received in the third discovery response; and
storing the first subset of second discovery response data.

6. The method of claim 1, further comprising:
receiving a message comprising an identifier of a service-providing entity associated with a service identified in the first discovery response data, wherein the message indicates that the service-providing entity is configured to provide a service; and
storing the identifier of the service-providing entity by modifying the first discovery response data to include the identifier of the service-providing entity.

7. The method of claim 1, further comprising:
receiving a message comprising an identifier of a service-providing entity associated with a service identified in the first discovery response data, wherein the message indicates that the service-providing entity is not configured to provide a service;
determining that the first discovery response data comprises the identifier of a service-providing entity; and
deleting the identifier of the service-providing entity from the first discovery response data.

8. A network node in a network of connected entities, the network node comprising:
a first processor adapted to execute computer-readable instructions; and
a first memory communicatively coupled to said first processor, said first memory having stored therein computer-readable instructions that, when executed by the first processor, cause the processor to perform operations comprising:
receiving a first discovery request from a first entity in the network of connected entities;
transmitting the first discovery request to a resource directory entity;
receiving a first discovery response from the resource directory entity;
storing first discovery response data based on the first discovery response;
transmitting the first discovery response to the first entity;
receiving a second discovery request from a second entity in the network of connected entities;
determining that discovery request data of the second discovery request corresponds to the first discovery response data; and
transmitting a second discovery response comprising the first discovery response data to the second entity and a notification to the resource directory entity indicating that the network node transmitted the second discovery response comprising the first discovery response data to the second entity.

9. The network node of claim 8, wherein the operations further comprise:
determining that discovery request data of a third discovery request corresponds to the first discovery response data; and
transmitting a third discovery response comprising a location of the first entity to a third entity.

10. The network node of claim 8, wherein the operations further comprise:
determining that discovery request data of a third discovery request corresponds to the first discovery response data; and
transmitting the third discovery request to the first entity.

11. The network node of claim 8, wherein the operations further comprise:
receiving a third discovery response from a third entity;
determining that a first subset of second discovery response data received in the third discovery response corresponds to a first subset of the first discovery response data; and
storing a second subset of the second discovery response data by modifying the first discovery response data to include the second subset of the second discovery response data.

12. The network node of claim 8, wherein the operations further comprise:
receiving a third discovery response from a third entity;
determining a first subset of second discovery response data received in the third discovery response; and
storing the first subset of second discovery response data.

13. The network node of claim 8, wherein the operations further comprise:
receiving a message comprising an identifier of a service-providing entity associated with a service identified in the first discovery response data, wherein the message indicates that the service-providing entity is configured to provide a service; and
storing the identifier of the service-providing entity by modifying the first discovery response data to include the identifier of the service-providing entity.

14. The network node of claim 8, wherein the operations further comprise:
receiving a message comprising an identifier of a service-providing entity associated with a service identified in the first discovery response data, wherein the message indicates that the service-providing entity is not configured to provide a service;

determining that the first discovery response data comprises the identifier of a service-providing entity; and deleting the identifier of the service-providing entity from the first discovery response data.

15. An entity in a network of connected entities, the entity comprising:

a first processor adapted to execute computer-readable instructions; and a first memory communicatively coupled to said first processor, said first memory having stored therein computer-readable instructions that, when executed by the first processor, cause the processor to perform operations comprising:

receiving a first discovery request from a first entity in the network of connected entities;

transmitting the first discovery request to a resource directory entity;

receiving a first discovery response from the resource directory entity;

storing first discovery response data based on the first discovery response;

transmitting the first discovery response to the first entity;

receiving a second discovery request from a second entity in the network of connected entities;

determining that discovery request data of the second discovery request corresponds to the first discovery response data; and transmitting a second discovery response comprising the first discovery response data to the second entity and a notification to the resource directory entity indicating that the second discovery response comprising the first discovery response data was transmitted to the second entity.

16. The entity of claim 15, wherein the operations further comprise:

determining that discovery request data of a third discovery request corresponds to the first discovery response data; and transmitting a third discovery response comprising a location of the first entity to a third entity.

17. The entity of claim 15, wherein the operations further comprise:

determining that discovery request data of a third discovery request corresponds to the first discovery response data; and transmitting the third discovery request to the first entity.

18. The entity of claim 15, wherein the operations further comprise:

receiving a third discovery response from a third entity;

determining that a first subset of second discovery response data received in the third discovery response corresponds to a first subset of the first discovery response data; and storing a second subset of the second discovery response data by modifying the first discovery response data to include the second subset of the second discovery response data.

19. The entity of claim 15, wherein the operations further comprise:

receiving a third discovery response from a third entity;

determining a first subset of second discovery response data received in the third discovery response; and storing the first subset of second discovery response data.

20. The entity of claim 15, wherein the operations further comprise:

receiving a message comprising an identifier of a service-providing entity associated with a service identified in the first discovery response data, wherein the message indicates that the service-providing entity is configured to provide a service; and storing the identifier of the service-providing entity by modifying the first discovery response data to include the identifier of the service-providing entity.

* * * * *